United States Patent
Hu et al.

(10) Patent No.: US 12,452,757 B2
(45) Date of Patent: Oct. 21, 2025

(54) COMMUNICATION METHOD AND COMMUNICATIONS APPARATUS FOR HANDLING DETECTION OF SECONDARY CELL GROUP FAILURE

(71) Applicant: Huawei Technologies Co., Ltd., Shenzhen (CN)

(72) Inventors: Xingxing Hu, Shanghai (CN); Le Yan, Shenzhen (CN); Hongping Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 587 days.

(21) Appl. No.: 17/706,913

(22) Filed: Mar. 29, 2022

(65) Prior Publication Data
US 2022/0225203 A1    Jul. 14, 2022

Related U.S. Application Data

(63) Continuation of application No. PCT/CN2019/109768, filed on Sep. 30, 2019.

(51) Int. Cl.
*H04W 36/30* (2009.01)
*H04W 24/10* (2009.01)
(Continued)

(52) U.S. Cl.
CPC ......... *H04W 36/305* (2018.08); *H04W 24/10* (2013.01); *H04W 36/00695* (2023.05);
(Continued)

(58) Field of Classification Search
CPC ............... H04W 36/305; H04W 76/19; H04W 36/00695; H04W 36/0069; H04W 72/56;
(Continued)

(56) References Cited

U.S. PATENT DOCUMENTS 11,219,079 B2 *   1/2022   Lee .................. H04L 1/1874
2019/0090144 A1   3/2019   Wu
(Continued)

FOREIGN PATENT DOCUMENTS

CN   104219787 A   12/2014
CN   107690154 A    2/2018
(Continued)

OTHER PUBLICATIONS

"MCG Failure Handling in Case of NE-DC and NR-DC," Agenda Item: 10.5.1, Source: Ericsson, Document for: Discussion, Decision, 3GPP TSG-RAN WG2#103bis, Tdoc R2-1814559 (Revision of R2-1812017), Chengdu, China, Oct. 8-12, 2018, 4 pages.
(Continued)

*Primary Examiner* — Allahyar Kasraian
(74) *Attorney, Agent, or Firm* — SLATER MATSIL, LLP

(57) ABSTRACT

A communication method and apparatus, the method including performing, by a terminal device or a chip of the terminal device, sending a master cell group (MCG) failure message to a master node (MN) via a secondary node (SN) in response to detecting that a wireless connection fails, and further in response to a secondary cell group (SCG) not failing, performing cell selection in response to the SCG failing, and accessing a target cell in response to the target cell being a candidate cell pre-configured by the MN, where the target cell is a cell selected by the terminal device during the cell selection, where the SCG is a group of cells associated with the SN, and where the MCG is a group of cells associated with the MN.

18 Claims, 9 Drawing Sheets

(51) Int. Cl.
  *H04W 36/00* (2009.01)
  *H04W 36/06* (2009.01)
  *H04W 72/56* (2023.01)
  *H04W 36/36* (2009.01)

(52) U.S. Cl.
  CPC ... *H04W 36/008357* (2023.05); *H04W 36/06* (2013.01); *H04W 72/56* (2023.01); *H04W 36/00833* (2023.05); *H04W 36/362* (2023.05)

(58) Field of Classification Search
  CPC ......... H04W 36/008357; H04W 24/10; H04W 36/06; H04W 36/362; H04W 36/00833
  See application file for complete search history.

(56) References Cited

U.S. PATENT DOCUMENTS

| | | | |
|---|---|---|---|
| 2019/0182881 A1 | 6/2019 | Teyeb et al. | |
| 2019/0182883 A1 | 6/2019 | He et al. | |
| 2020/0045764 A1* | 2/2020 | Kim | H04W 36/00695 |
| 2020/0305213 A1* | 9/2020 | Teyeb | H04W 72/23 |
| 2020/0351968 A1* | 11/2020 | Yilmaz | H04W 76/19 |
| 2022/0007257 A1* | 1/2022 | Wang | H04W 24/02 |
| 2022/0007259 A1* | 1/2022 | Fujishiro | H04W 76/27 |
| 2022/0104098 A1* | 3/2022 | Takahashi | H04W 36/305 |
| 2022/0110180 A1* | 4/2022 | Jung | H04W 76/30 |
| 2022/0124592 A1* | 4/2022 | Takahashi | H04W 76/19 |
| 2022/0225191 A1* | 7/2022 | Shi | H04W 36/00838 |
| 2022/0264687 A1* | 8/2022 | Orsino | H04W 76/15 |
| 2022/0279412 A1* | 9/2022 | Wu | H04W 76/27 |

FOREIGN PATENT DOCUMENTS

| | | |
|---|---|---|
| WO | 2018028969 A1 | 2/2018 |
| WO | 2018128572 A1 | 7/2018 |
| WO | 2019032002 A1 | 2/2019 |
| WO | 2019093940 A1 | 5/2019 |
| WO | 2020034949 A1 | 2/2020 |
| WO | 2020167012 A1 | 8/2020 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 15)," 3GPP TS 36.331 V15.7.0, Sep. 2019, 962 pages.

"3rd Generation Partnership Project; Technical Specification Group Radio Access Network; Evolved Universal Terrestrial Radio Access (E-UTRA) and NR; Multi-connectivity; Stage 2 (Release 15)," 3GPP TS 37.340 V15.6.0, Jun. 2019, 69 pages.

"3rd Generation Partnership Project; Technical Specification Group Radio Access Network; Evolved Universal Terrestrial Radio Access (E-UTRA) and NR; Multi-connectivity; Stage 2 (Release 15)," 3GPP TS 37.340 V15.7.0, Sep. 2019, 70 pages.

"3rd Generation Partnership Project; Technical Specification Group Radio Access Network; NR; User Equipment (UE) procedures in Idle mode and RRC Inactive state (Release 15)," 3GPP TS 38.304 V15.5.0, Sep. 2019, 29 pages.

3rd Generation Partnership Project; Technical Specification Group Radio Access Network; NR; Radio Link Control (RLC) protocol specification (Release 15), 3GPP TS 38.322 V15.5.0, Mar. 2019, 33 pages.

"3rd Generation Partnership Project; Technical Specification Group Radio Access Network; NR; Packet Data Convergence Protocol (PDCP) specification(Release 15)," 3GPP TS 38.323 V15.6.0, Jun. 2019, 26 pages.

"3rd Generation Partnership Project; Technical Specification Group Radio Access Network; NR; Radio Resource Control (RRC) protocol specification (Release 15)," 3GPP TS 38.331 V15.7.0, Sep. 2019, 527 pages.

"Discussion on Handling Split SRB during SCG Failure," Agenda Item: 10.4.1.5.2, Source: InterDigital Inc., Document for: Discussion, Decision, 3GPP TSG-RAN WG2 Meeting #101 R2-1802818, Athens, Greece, Feb. 26-Mar. 2, 2018, 4 pages.

"Applicability of Using SCG for Fast MCG Recovery," Agenda Item: 11.10.5, Source: OPPO, Document for: Discussion and Decision, 3GPP TSG-RAN2 #106, R2-1907889, Reno, US, May 13-May 17, 2019, 4 pages.

"Bounded Time for MCG Recovery and MCG Recovery Criteria," Agenda Item: 11.10.5 (LTE_NR_DC-CA_enh-Core), Source: LG Electronics France, Document for: Discussion and Decision, 3GPP TSG-RAN WG2 Meeting #106, R2-1908054, Reno, USA, May 13-17, 2019, 3 pages.

"Open Issues for MCG Fast Recovery," Agenda Item: 11.10.5, Source: OPPO, Document for: Discussion and Decision, 3GPP TSG-RAN WG2 Meeting #107, R2-1909652, Prague, Czech Republic, Aug. 26-30, 2019, 4 pages.

"Discussion on the Fast RLF Recovery with the Applying of CHO and DC," Source: ZTE Corporation, Sanechips, Agenda Item: 11.9.3.5, Document for: Discussion and Decision, 3GPP TSG RAN WG2 Meeting #107, R2-1910743, Prague, Czech, Aug. 26-30, 2019, 5 pages.

"Study on Application of CHO Mechanism to Conditional PSCell Additon/Change," Source: Ntt Docomo, Inc., Document for: Discussion and Decisions, Agenda Item: 11.10.4.4, 3GPP TSG-RAN WG2 Meeting #107, R2-1911190, Prague, Czech, Aug. 26-30, 2019, 5 pages.

* cited by examiner

COMMUNICATION METHOD AND COMMUNICATIONS APPARATUS FOR HANDLING DETECTION OF SECONDARY CELL GROUP FAILURE

CROSS-REFERENCE TO RELATED APPLICATIONS

This application is a continuation of International Application No. PCT/CN2019/109768, filed on Sep. 30, 2019, which is hereby incorporated by reference in its entirety.

TECHNICAL FIELD

This application relates to the communication field, and more specifically, to a communication method and a communications apparatus.

BACKGROUND

Currently, a radio resource control (RRC) reestablishment procedure may occur due to many factors, for example, a radio link failure (RLF) occurs in a master cell group (MCG), a handover failure occurs in the MCG, or an RRC reconfiguration failure occurs. However, interruption to communication of a terminal device may occur due to RRC reestablishment. Therefore, RRC reestablishment needs to be avoided as much as possible.

SUMMARY

This application provides a communication method and a communications apparatus, to avoid RRC reestablishment as much as possible.

According to a first aspect, a communication method is provided, and includes: When a terminal device detects that a wireless connection fails, the terminal device performs cell selection, and if a target cell is a candidate cell pre-configured by a master node (MN), the terminal device accesses the target cell, or if a target cell is not a candidate cell, and the terminal device does not detect that a secondary cell group (SCG) fails, the terminal device sends a master cell group MCG failure message to an MN via a secondary node (SN), where the target cell is a cell selected by the terminal device during cell selection.

It should be understood that there are one or more candidate cells.

The SCG is a group of cells associated with the SN, and may include a primary secondary cell, PSCell (primary secondary cell), and may further include one or more secondary cells SCells (secondary cells). The cell is a serving cell. In this application, the serving cell is a cell for which the terminal device provides a service.

An MCG is a group of cells associated with the MN, and may include a primary cell PCell (primary cell), and may further include one or more secondary cells SCells (secondary cells). The cell is a serving cell.

The primary SCG cell and the primary cell may be collectively referred to as a special cell (SpCell).

In a non-dual connectivity DC scenario, the special cell may be a primary cell.

That the MN configures the candidate cell means that the MN configures information about the candidate cell for the terminal device. The information about the candidate cell may include, for example, a cell global identifier (CGI) of the candidate cell, or include a physical cell identifier (PCI) of the candidate cell and frequency information corresponding to the candidate cell. The terminal device may access the candidate cell based on the information about the candidate cell.

Optionally, before the terminal device performs cell selection, the method may further include: The terminal device receives conditional handover (CHO) configuration information sent by the MN, where the CHO configuration information is used to configure the candidate cell.

In other words, the candidate cell is pre-configured by the MN by using the CHO configuration information. For a specific form of the CHO configuration information, refer to the conventional technology.

Optionally, that the terminal device detects that the wireless connection fails includes one or more of the following cases: a radio link failure occurs in the MCG, a handover failure occurs in the MCG, a radio resource control RRC reconfiguration failure occurs, or integrity check performed by the terminal device on a data packet received over a signaling radio bearer (SRB) 1 or an SRB 2 fails.

In a conventional handover procedure, a handover failure may occur due to sending of a measurement report or a handover command. In this mechanism, when the selected cell is the candidate cell, the terminal device accesses the selected cell. Because the information about the candidate cell has been pre-configured by the MN, handover is performed without a need to send the measurement report or wait for the handover command, so that a success rate of accessing the selected cell can be improved. In addition, when the cell selected by the terminal device is not the candidate cell, the terminal device sends the MCG failure message to the MN via the SN, to trigger the MN to recover the wireless connection in an RRC reconfiguration procedure or a cell handover procedure, so as to avoid RRC reestablishment in the conventional technology. Compared with the conventional technology in which communication interruption or a packet loss may occur due to an RRC reestablishment procedure, the RRC reconfiguration procedure and the cell handover procedure in this embodiment do not result in interruption to communication of the terminal device or a packet loss. Therefore, according to the method provided in this application, the RRC reestablishment procedure is avoided, so that the communication interruption and the packet loss can be avoided, to improve user experience.

With reference to the first aspect, in some implementations of the first aspect, the method further includes: If the target cell is not the candidate cell, and the terminal device detects that the SCG fails, the terminal device sends a radio resource control RRC reestablishment request message to the target cell.

According to this solution, the terminal device may initiate an RRC reestablishment procedure by sending the RRC reestablishment request message, to recover the wireless connection.

With reference to the first aspect, in some implementations of the first aspect, the method further includes: If accessing the target cell by the terminal device fails, and the terminal device does not detect that the SCG fails, the terminal device sends the MCG failure message to the MN via the SN.

According to this solution, when accessing the target cell fails, the terminal device may send the MCG failure message to the MN via the SN, to initiate an MCG fast recovery procedure to recover the wireless connection, so as to avoid RRC reestablishment.

With reference to the first aspect, in some implementations of the first aspect, before the terminal device performs cell selection, the method further includes: The terminal device receives first indication information sent by the MN, where the first indication information is used to indicate the terminal device to preferentially perform cell selection when the terminal device detects that the wireless connection fails, and access a selected cell when the selected cell is the candidate cell, or the first indication information includes a first condition, and the first condition is used to indicate the terminal device to preferentially perform cell selection when the terminal device detects that the wireless connection fails and the first condition is met, and access a selected cell when the selected cell is the candidate cell, or the first indication information includes a first condition, and the first indication information is further used to indicate the terminal device to preferentially perform cell selection when the terminal device detects that the wireless connection fails and the first condition is met, and access a selected cell when the selected cell is the candidate cell.

Optionally, the first indication information may be a radio resource control (RRC) message. However, this is not limited in this application.

In this solution, the MN indicates, to the terminal device by using the first indication information, an operation that needs to be performed by the terminal device when the terminal device detects that the wireless connection fails, and the terminal device may perform a corresponding operation according to an indication of the MN, to avoid communication interruption caused because the terminal device does not perform a proper operation when detecting that the wireless connection fails.

Optionally, the first condition includes one or more of the following: a cell whose signal quality is greater than or equal to a first threshold exists in the candidate cell, or signal quality of the SN is less than or equal to a second threshold.

According to this solution, the terminal device accesses the target cell when the signal quality is greater than or equal to a specific threshold, so that an access success rate can be improved. In addition, when the signal quality of the SN is less than or equal to a specific threshold, the SN may not successfully receive a message sent by the terminal device to the SN. Therefore, compared with a manner in which the terminal device sends the MCG failure message to the MN via the SN to attempt to recover the wireless connection, this manner in which the terminal device attempts to access the candidate cell through cell selection to recover the wireless connection is more appropriate.

With reference to the first aspect, in some implementations of the first aspect, before the terminal device sends the master cell group MCG failure message to the MN via the SN, the method further includes: The terminal device receives second indication information sent by the MN, where the second indication information is used to indicate the terminal device to send the MCG failure message to the MN via the SN when the selected cell is not the candidate cell, or the second indication information includes a second condition, and the second condition is used to indicate the terminal device to send the MCG failure message to the MN via the SN when the selected cell is not the candidate cell and the second condition is met, or the second indication information includes a second condition, and the second indication information is further used to indicate the terminal device to send the MCG failure message to the MN via the SN when the selected cell is not the candidate cell and the second condition is met.

Optionally, the second indication information may be an RRC message. However, this is not limited in this application.

According to this solution, the terminal device may perform a corresponding operation according to an indication of the MN when the selected cell is not the candidate cell, to avoid a problem such as prolonged communication interruption caused by some improper operations.

Optionally, the second condition includes one or more of the following: signal quality of the selected cell is less than or equal to a third threshold, or the signal quality of the SN is greater than or equal to a fourth threshold.

When the signal quality of the target cell is less than or equal to a specific threshold, a probability that the terminal device successfully accesses the target cell is low. Therefore, it is more suitable for the terminal device to send the MCG failure message to the MN via the SN, to recover the wireless connection. In addition, when the signal quality of the SN is greater than or equal to a specific threshold, quality of communication between the terminal device and the SN is good. Therefore, the terminal device may send the MCG failure message to the MN via the SN, to attempt to recover the wireless connection.

According to a second aspect, a communication method is provided, and includes: A master node MN sends first indication information. The MN sends the first indication information to a terminal device, where the first indication information is used to indicate the terminal device to preferentially perform cell selection when the terminal device detects that a wireless connection fails, and access a selected cell when the selected cell is a candidate cell, or the first indication information includes a first condition, and the first condition is used to indicate the terminal device to preferentially perform cell selection when the terminal device detects that a wireless connection fails and the first condition is met, and access a selected cell when the selected cell is a candidate cell, or the first indication information includes a first condition, and the first indication information is further used to indicate the terminal device to preferentially perform cell selection when the terminal device detects that a wireless connection fails and the first condition is met, and access a selected cell when the selected cell is a candidate cell, and the candidate cell is a cell pre-configured by the MN for the terminal device.

It should be understood that there are one or more candidate cells.

Optionally, that the terminal device detects that the wireless connection fails includes one or more of the following cases: a radio link failure occurs in an MCG, a handover failure occurs in an MCG, a radio resource control RRC reconfiguration failure occurs, or integrity check performed by the terminal device on a data packet received over an SRB 1 or an SRB 2 fails.

That the MN configures the candidate cell means that the MN configures information about the candidate cell for the terminal device. The information about the candidate cell may include, for example, a cell global identifier (CGI) of the candidate cell, or include a physical cell identifier (PCI) of the candidate cell and frequency information corresponding to the candidate cell. The terminal device may access the candidate cell based on the information about the candidate cell.

Optionally, before the MN sends the first indication information to the terminal device, the method further includes: The MN sends CHO configuration information to the terminal device, where the CHO configuration information is used to configure the candidate cell.

The MN indicates, to the terminal device by using the first indication information, an operation that needs to be performed by the terminal device when the terminal device detects that the wireless connection fails, and the terminal may perform a corresponding operation according to an indication of the MN, to avoid communication interruption caused because the terminal device does not properly recover the wireless connection when detecting that the wireless connection fails.

Optionally, the first condition includes one or more of the following: a cell whose signal quality is greater than or equal to a first threshold exists in the candidate cell, or signal quality of a secondary node SN is less than or equal to a second threshold.

With reference to the second aspect, in some implementations of the second aspect, the method may further include: The MN generates second indication information. The MN sends the second indication information to the terminal device, where the second indication information is used to indicate the terminal device to send a master cell group MCG failure message to the MN via the secondary node SN when the selected cell is not the candidate cell, or the second indication information includes a second condition, and the second condition is used to indicate the terminal device to send an MCG failure message to the MN via the SN when the selected cell is not the candidate cell and the second condition is met, or the second indication information includes a second condition, and the second indication information is used to indicate the terminal device to send an MCG failure message to the MN via the SN when the selected cell is not the candidate cell and the second condition is met.

According to this solution, the MN indicates the terminal device to send the MCG failure message to the MN via the SN when the selected cell is not the candidate cell, so that the terminal device can recover a radio link based on an MCG fast recovery procedure, to avoid RRC reestablishment.

Optionally, the second condition includes one or more of the following: signal quality of the selected cell is less than or equal to a third threshold, or the signal quality of the SN is greater than or equal to a fourth threshold.

According to a third aspect, a communication method is provided, and includes: When a terminal device detects that a wireless connection fails, if the terminal device does not detect that a secondary cell group SCG fails, the terminal device sends a master cell group MCG failure message to a master node MN via a secondary node SN. If the terminal device detects that the SCG fails, the terminal device performs cell selection. If a target cell is a candidate cell pre-configured by the MN, the terminal device accesses the target cell, where the target cell is a cell selected by the terminal device during cell selection. The SCG is a group of cells associated with the SN, and the MCG is a group of cells associated with the MN.

It should be understood that there are one or more candidate cells.

Optionally, that the terminal device detects that the wireless connection fails includes one or more of the following cases: a radio link failure occurs in the MCG, a handover failure occurs in the MCG, a radio resource control RRC reconfiguration failure occurs, or integrity check performed by the terminal device on a data packet received over one or more of an SRB 1 or an SRB 2 fails.

That the MN configures the candidate cell means that the MN configures information about the candidate cell for the terminal device. The information about the candidate cell may include, for example, a cell global identifier (CGI) of the candidate cell, or include a physical cell identifier (PCI) of the candidate cell and frequency information corresponding to the candidate cell. The terminal device may access the candidate cell based on the information about the candidate cell.

According to the method provided in this application, when the terminal device detects that the wireless connection fails, if the terminal device does not detect that the SCG fails, the terminal device sends the MCG failure message to the MN via the SN, to trigger the MN to recover the wireless connection in an RRC reconfiguration procedure or a cell handover procedure, so as to avoid RRC reestablishment in the conventional technology. In addition, if the terminal device detects that the SCG fails, the terminal device may access the candidate cell when selecting the candidate cell, to further avoid an RRC reestablishment procedure in the conventional technology. According to the foregoing method, the RRC reestablishment procedure is avoided, so that communication interruption and a packet loss can be avoided, to improve user experience.

With reference to the third aspect, in some implementations of the third aspect, the method further includes: If the target cell is not the candidate cell, the terminal device sends a radio resource control RRC reestablishment request message to the target cell.

According to this solution, the wireless connection can be recovered through RRC reestablishment.

With reference to the third aspect, in some implementations of the third aspect, the method further includes: If the terminal device does not receive a response to the MCG failure message from the MN, the terminal device performs cell selection, and the terminal device accesses a selected cell when the selected cell is the candidate cell pre-configured by the MN.

According to this solution, when an MCG fast recovery procedure initiated by the terminal device by sending the MCG failure message fails, the terminal device may attempt to access the candidate cell, to avoid RRC reestablishment.

With reference to the third aspect, in some implementations of the third aspect, before the terminal device sends the master cell group MCG failure message to the master node MN via the secondary node SN, the method further includes: The terminal device receives third indication information sent by the MN, where the third indication information is used to indicate the terminal device to preferentially send the MCG failure message to the MN via the SN when the terminal device detects that the wireless connection fails, or the third indication information includes a third condition, and the third condition is used to indicate the terminal device to preferentially send the MCG failure message to the MN via the SN when the terminal device detects that the wireless connection fails and the third condition is met, or the third indication information includes a third condition, and the third indication information is used to indicate the terminal device to preferentially send the MCG failure message to the MN via the SN when the terminal device detects that the wireless connection fails and the third condition is met.

Optionally, the third indication information may be an RRC message. However, this is not limited in this application.

In this solution, the MN indicates, to the terminal device by using the third indication information, an operation that needs to be performed by the terminal device when the terminal device detects that the wireless connection fails, and the terminal device may perform a corresponding operation according to an indication of the MN, to avoid communication interruption caused because the terminal device does not perform a proper operation when detecting that the wireless connection fails.

Optionally, the third condition includes: signal quality of the SN is greater than or equal to a second threshold.

When the signal quality of the SN is greater than a specific threshold, quality of communication between the terminal device and the SN is good. Therefore, the terminal device may send the MCG failure message to the MN via the SN, to attempt to recover the wireless connection.

With reference to the third aspect, in some implementations of the third aspect, before the terminal device accesses the target cell, the method further includes: The terminal device receives fourth indication information sent by the MN, where the fourth indication information is used to indicate the terminal device to access the candidate cell when the terminal device cannot send the MCG failure message to the MN via the SN or does not receive a response to the MCG failure message from the MN, or the fourth indication information includes a fourth condition, and the fourth condition is used to indicate the terminal device to access the candidate cell when the terminal device cannot send the MCG failure message to the MN via the SN or does not receive a response to the MCG failure message from the MN, and when the fourth condition is met, or the fourth indication information includes a fourth condition, and the fourth indication information is used to indicate the terminal device to access the candidate cell when the terminal device cannot send the MCG failure message to the MN via the secondary node SN or does not receive a response to the MCG failure message from the MN, and when the fourth condition is met.

Optionally, the fourth indication information may be an RRC message. However, this is not limited in this application.

According to this solution, the terminal device may perform a corresponding operation according to an indication of the MN when the terminal device cannot send the MCG failure message to the MN via the SN or does not receive the response to the MCG failure message from the MN, to avoid a problem such as prolonged communication interruption caused by some improper operations.

Optionally, the fourth condition includes: a cell whose signal quality is greater than or equal to a fifth threshold exists in the candidate cell.

The terminal device accesses the target cell when the signal quality is greater than a specific threshold, so that an access success rate can be improved.

According to a fourth aspect, a communication method is provided, and includes: A master node MN generates third indication information. The MN sends the third indication information to a terminal device, where the third indication information is used to indicate the terminal device to preferentially send a master cell group MCG failure message to the MN via a secondary node SN when the terminal device detects that a wireless connection fails, or the third indication information includes a third condition, and the third condition is used to indicate the terminal device to preferentially send an MCG failure message to the MN via an SN when the terminal device detects that a wireless connection fails and the third condition is met, or the third indication information includes a third condition, and the third indication information is used to indicate the terminal device to preferentially send an MCG failure message to the MN via an SN when the terminal device detects that a wireless connection fails and the third condition is met.

According to the method provided in this application, the MN indicates, to the terminal device by using the third indication information, an operation that needs to be performed by the terminal device when the terminal device detects that the wireless connection fails, and the terminal may perform a corresponding operation according to an indication of the MN, to avoid communication interruption caused because the terminal device does not properly recover the wireless connection when detecting that the wireless connection fails.

Optionally, the third condition includes: signal quality of the SN is greater than or equal to a second threshold.

With reference to the fourth aspect, in some implementations of the fourth aspect, the MN generates fourth indication information.

The MN sends the fourth indication information to the terminal device, where the fourth indication information is used to indicate the terminal device to access a candidate cell when the terminal device cannot send the MCG failure message to the MN via the SN or does not receive a response to the MCG failure message from the MN, or the fourth indication information includes a fourth condition, and the fourth condition is used to indicate the terminal device to access a candidate cell when the terminal device cannot send the MCG failure message to the MN via the SN or does not receive a response to the MCG failure message from the MN, and when the fourth condition is met, or the fourth indication information includes a fourth condition, and the fourth indication information is used to indicate the terminal device to access a candidate cell when the terminal device cannot send the MCG failure message to the MN via the secondary node SN or does not receive a response to the MCG failure message from the MN, and when the fourth condition is met, and the candidate cell is a cell preconfigured by the MN for the terminal device.

According to the method, the terminal device may preferentially access the candidate cell, to avoid direct RRC reestablishment.

Optionally, the fourth condition includes: a cell whose signal quality is greater than or equal to a fifth threshold exists in the candidate cell.

According to a fifth aspect, a communication method is provided, and includes: When a terminal device detects that a wireless connection fails, if a candidate cell meeting a sixth condition exists, the terminal device accesses a target cell, where the target cell is the candidate cell meeting the sixth condition, and the candidate cell is a cell pre-configured by a master node MN, or if a candidate cell meeting a sixth condition does not exist, and the terminal device does not detect that a secondary cell group SCG fails, the terminal device sends a master cell group MCG failure message to an MN via a secondary node SN.

That the MN configures the candidate cell means that the MN configures information about the candidate cell for the terminal device. The information about the candidate cell may include, for example, a cell global identifier (CGI) of the candidate cell, or include a physical cell identifier (PCI) of the candidate cell and frequency information corresponding to the candidate cell. The terminal device may access the candidate cell based on the information about the candidate cell.

Optionally, before the terminal device accesses the target cell, the method may further include: The terminal device receives CHO configuration information sent by the MN, where the CHO configuration information is used to configure the candidate cell.

In other words, the candidate cell is pre-configured by the MN by using the CHO configuration information. For a specific form of the CHO configuration information, refer to the conventional technology.

Optionally, that the terminal device detects that the wireless connection fails includes one or more of the following cases: a radio link failure occurs in an MCG, a handover failure occurs in an MCG, a radio resource control RRC reconfiguration failure occurs, or integrity check performed by the terminal device on data packets received over a signaling radio bearer (SRB) 1 and an SRB 2 fails.

In a conventional handover procedure, a handover failure may occur due to sending of a measurement report or a handover command. In this mechanism, when the selected cell is the candidate cell, the terminal device accesses the selected cell. Because the information about the candidate cell has been pre-configured by the MN, handover is performed without a need to send the measurement report or wait for the handover command, so that a success rate of accessing the selected cell can be improved. In addition, when the cell selected by the terminal device is not the candidate cell, the terminal device sends the MCG failure message to the MN via the SN, to trigger the MN to recover the wireless connection in an RRC reconfiguration procedure or a cell handover procedure, so as to avoid RRC reestablishment in the conventional technology. Compared with the conventional technology in which communication interruption or a packet loss may occur due to an RRC reestablishment procedure, the RRC reconfiguration procedure and the cell handover procedure in this embodiment do not result in interruption to communication of the terminal device or a packet loss. Therefore, according to the method provided in this application, the RRC reestablishment procedure is avoided, so that the communication interruption and the packet loss can be avoided, to improve user experience.

Optionally, the sixth condition includes: signal quality of the cell is greater than or equal to a specific threshold.

When the signal quality of the cell is greater than the specific threshold, a probability that the terminal device successfully accesses the cell is high. Therefore, the terminal device may attempt to access the target cell.

With reference to the fifth aspect, in some implementations of the fifth aspect, the method further includes: If the candidate cell meeting the sixth condition does not exist, and the terminal device detects that the SCG fails, the terminal device sends a radio resource control RRC reestablishment request message to the target cell.

According to this solution, the terminal device may initiate an RRC reestablishment procedure by sending the RRC reestablishment request message, to recover the wireless connection.

With reference to the fifth aspect, in some implementations of the fifth aspect, the method further includes: If accessing the target cell by the terminal device fails, and the terminal device does not detect that the SCG fails, the terminal device sends the MCG failure message to the MN via the SN.

According to this solution, when accessing the target cell fails, the terminal device may send the MCG failure message to the MN via the SN, to initiate an MCG fast recovery procedure to recover the wireless connection, so as to avoid RRC reestablishment.

With reference to the fifth aspect, in some implementations of the fifth aspect, before the terminal device accesses the target cell, the method further includes: The terminal device receives fifth indication information sent by the MN, where the fifth indication information is used to indicate the terminal device to preferentially determine, when the terminal device detects that the wireless connection fails, whether the candidate cell meeting the sixth condition exists, and access, when the candidate cell meeting the sixth condition exists, the candidate cell meeting the sixth condition.

Optionally, the fifth indication information may be an RRC message. However, this is not limited in this application.

With reference to the fifth aspect, in some implementations of the fifth aspect, before the terminal device sends the master cell group MCG failure message to the MN via the secondary node SN, the method further includes: The terminal device receives sixth indication information sent by the MN, where the sixth indication information is used to indicate the terminal device to send the MCG failure message to the MN via the SN when the candidate cell meeting the sixth condition does not exist.

With reference to the fifth aspect, in some implementations of the fifth aspect, the method further includes: If accessing the target cell by the terminal device fails, and the terminal device does not detect that the SCG fails, the terminal device sends the MCG failure message to the MN via the SN.

According to this solution, when accessing the target cell fails, the terminal device may send the MCG failure message to the MN via the SN, to initiate an MCG fast recovery procedure to recover the wireless connection, so as to avoid RRC reestablishment.

According to a sixth aspect, a communication method is provided, and includes: A master node MN generates fifth indication information. The MN sends the fifth indication information to a terminal device, where the fifth indication information is used to indicate the terminal device to preferentially determine, when the terminal device detects that a wireless connection fails, whether a candidate cell meeting a sixth condition exists, and access, when the candidate cell meeting the sixth condition exists, the candidate cell meeting the sixth condition, and the candidate cell is a cell pre-configured by the MN for the terminal device.

The MN indicates, to the terminal device by using the fifth indication information, an operation that needs to be performed by the terminal device when the terminal device detects that the wireless connection fails, and the terminal may perform a corresponding operation according to an indication of the MN, to avoid communication interruption caused because the terminal device does not properly recover the wireless connection when detecting that the wireless connection fails.

Optionally, the sixth condition includes: signal quality of the cell is greater than or equal to a specific threshold.

Optionally, that the terminal device detects that the wireless connection fails includes one or more of the following cases: a radio link failure occurs in an MCG, a handover failure occurs in an MCG, a radio resource control RRC reconfiguration failure occurs, or integrity check performed by the terminal device on a data packet received over either of an SRB 1 and an SRB 2 fails.

With reference to the sixth aspect, in some implementations of the sixth aspect, the method further includes: The MN generates sixth indication information. The MN sends the sixth indication information to the terminal device, where the sixth indication information is used to indicate the terminal device to send an MCG failure message to the MN via an SN when the candidate cell meeting the sixth condition does not exist.

According to this solution, the MN indicates the terminal device to send the MCG failure message to the MN via the SN when the candidate cell meeting the sixth condition does not exist, so that the terminal device can recover a radio link based on an MCG fast recovery procedure, to avoid RRC reestablishment.

According to a seventh aspect, a communication method is provided, and includes: When a terminal device detects that a wireless connection fails, if the terminal device does not detect that a secondary cell group SCG fails, the terminal device sends a master cell group MCG failure message to a master node MN via a secondary node SN. When the terminal device detects that the SCG fails, if a candidate cell meeting a seventh condition exists, the terminal device accesses a target cell, where the target cell is the candidate cell meeting the seventh condition, and the candidate cell is a cell pre-configured by the master node MN.

It should be understood that there are one or more candidate cells.

Optionally, that the terminal device detects that the wireless connection fails includes one or more of the following cases: a radio link failure occurs in an MCG, a handover failure occurs in an MCG, a radio resource control RRC reconfiguration failure occurs, or integrity check performed by the terminal device on a data packet received over an SRB 1 or an SRB 2 fails.

That the MN configures the candidate cell means that the MN configures information about the candidate cell for the terminal device. The information about the candidate cell may include, for example, a cell global identifier (CGI) of the candidate cell, or include a physical cell identifier (PCI) of the candidate cell and frequency information corresponding to the candidate cell. The terminal device may access the candidate cell based on the information about the candidate cell.

According to the method provided in this application, when the terminal device detects that the wireless connection fails, if the terminal device does not detect that the SCG fails, the terminal device sends the MCG failure message to the MN via the SN, to trigger the MN to recover the wireless connection in an RRC reconfiguration procedure or a cell handover procedure, so as to avoid RRC reestablishment in the conventional technology. In addition, if the terminal device detects that the SCG fails, the terminal device may access the candidate cell when the candidate cell meeting the seventh condition exists, to further avoid an RRC reestablishment procedure in the conventional technology. According to the foregoing method, the RRC reestablishment procedure is avoided, so that communication interruption and a packet loss can be avoided, to improve user experience.

Optionally, the seventh condition includes: signal quality of the cell is greater than or equal to a specific threshold.

When the signal quality of the cell is greater than or equal to the specified threshold, an access success rate can be improved. Therefore, compared with RRC reestablishment, an operation that the terminal device accesses the candidate cell whose signal quality is greater than or equal to the specific threshold is proper. With reference to the seventh aspect, in some implementations of the seventh aspect, the method further includes: If the candidate cell meeting the seventh condition exists, the terminal device sends a radio resource control RRC reestablishment request message to the target cell.

With reference to the seventh aspect, in some implementations of the seventh aspect, the method further includes: If the terminal device does not receive a response to the MCG failure message from the MN, the terminal device accesses, when the candidate cell meeting the seventh condition exists, the candidate cell meeting the seventh condition.

According to this solution, when an MCG fast recovery procedure initiated by the terminal device by sending the MCG failure message fails, the terminal device may attempt to access the candidate cell, to avoid RRC reestablishment.

With reference to the seventh aspect, in some implementations of the seventh aspect, before the terminal device sends the master cell group MCG failure message to the master node MN via the secondary node SN, the method further includes: The terminal device receives seventh indication information sent by the MN, where the seventh indication information is used to indicate the terminal device to preferentially send the MCG failure message to the MN via the SN when the terminal device detects that the wireless connection fails.

Optionally, the seventh indication information may be an RRC message. However, this is not limited in this application.

In this solution, the MN indicates, to the terminal device by using the seventh indication information, an operation that needs to be performed by the terminal device when the terminal device detects that the wireless connection fails, and the terminal device may perform a corresponding operation according to an indication of the MN, to avoid communication interruption caused because the terminal device does not perform a proper operation when detecting that the wireless connection fails.

With reference to the seventh aspect, in some implementations of the seventh aspect, before the terminal device accesses the target cell, the method further includes: The terminal device receives eighth indication information sent by the MN, where the eighth indication information is used to indicate the terminal device to access the candidate cell when the terminal device cannot send the MCG failure message to the MN via the SN or does not receive a response to the MCG failure message from the MN.

Optionally, the eighth indication information may be an RRC message. However, this is not limited in this application.

According to this solution, the terminal device may perform a corresponding operation according to an indication of the MN when the terminal device cannot send the MCG failure message to the MN via the SN or does not receive the response to the MCG failure message from the MN, to avoid a problem such as prolonged communication interruption caused by some improper operations.

According to an eighth aspect, a communication method is provided, and includes: A master node MN generates seventh indication information. The MN sends the seventh indication information to a terminal device, where the seventh indication information is used to indicate the terminal device to preferentially send a master cell group MCG failure message to the MN via a secondary node SN when the terminal device detects that a wireless connection fails.

The MN indicates, by using the seventh indication information, the terminal device to preferentially send the master cell group MCG failure message to the MN via the secondary node SN when the terminal device detects that the wireless connection fails, so that the terminal device can preferentially recover the wireless connection in an MCG fast recovery procedure, to avoid RRC reestablishment.

Optionally, the method further includes: The MN generates eighth indication information. The MN sends the eighth indication information to the terminal device, where the eighth indication information is used to indicate the terminal device to access a candidate cell when the terminal device cannot send the MCG failure message to the MN via the SN or does not receive a response to the MCG failure message from the MN.

The MN indicates, by using the eighth indication information, the terminal device to access the candidate cell when the terminal device cannot send the MCG failure message to the MN via the SN or does not receive the response to the MCG failure message from the MN, so that the terminal device can preferentially access the candidate cell, to avoid RRC reestablishment.

According to a ninth aspect, a communication method is provided, and includes: When a terminal device detects that an SCG fails, if a candidate cell meeting an eighth condition exists, the terminal device accesses a target cell, where the target cell is the candidate cell meeting the eighth condition, and the candidate cell is a cell pre-configured by an MN.

According to the method provided in this application, when an SN fails, the terminal device may first determine signal quality of the candidate cell. If the signal quality is good, the terminal device may be directly handed over to the candidate cell. After being handed over to the candidate cell, the terminal device may directly perform data communication in the candidate cell (by using previous radio configuration information corresponding to the candidate cell), and does not need to first suspend transmission of a bearer in the SCG, to reduce service interruption time.

Optionally, the eighth condition includes: signal quality of the cell is greater than or equal to a specific threshold.

A handover success probability is high when the signal quality of the cell is good. Therefore, when detecting that the SCG fails, the terminal device may access a candidate cell with good signal quality.

Optionally, with reference to the ninth aspect, in some implementations of the ninth aspect, the method further includes: If the cell meeting the eighth condition does not exist, the terminal device sends an SCG failure indication information to the MN.

According to the method, RRC reestablishment can be avoided.

Optionally, with reference to the ninth aspect, in some implementations of the ninth aspect, before the terminal device accesses the target cell, the method further includes: The terminal device receives ninth indication information sent by the MN, where the ninth indication information is used to indicate the terminal device to access the target cell when the terminal device detects that the SCG fails and the candidate cell meeting the eighth condition exists.

According to a tenth aspect, a communication method is provided, and includes: An MN generates ninth indication information. The MN sends the ninth indication information to a terminal device, where the ninth indication information is used to indicate the terminal device to access a target cell when the terminal device detects that an SCG fails and a candidate cell meeting an eighth condition exists, the target cell is the candidate cell meeting the eighth condition, and the candidate cell is a cell pre-configured by the MN.

According to the method provided in this application, when an SN fails, the terminal device may first determine signal quality of the candidate cell. If the signal quality is good, the terminal device may be directly handed over to the candidate cell. After being handed over to the candidate cell, the terminal device may directly perform data communication in the candidate cell (by using previous radio configuration information corresponding to the candidate cell), and does not need to first suspend transmission of a bearer in the SCG, to reduce service interruption time.

Optionally, the ninth indication information may be an RRC message.

Optionally, the eighth condition includes: signal quality of the cell is greater than or equal to a specific threshold.

According to an eleventh aspect, a communications apparatus is provided, and includes modules or units configured to perform the method according to any one of the first aspect, the third aspect, the fifth aspect, the seventh aspect, the ninth aspect, and the possible implementations of the first aspect, the third aspect, the fifth aspect, the seventh aspect, and the ninth aspect.

According to a twelfth aspect, a communications apparatus is provided, and includes a processor. The processor is coupled to a memory, and may be configured to execute instructions in the memory, to implement the method according to any one of the first aspect, the third aspect, the fifth aspect, the seventh aspect, the ninth aspect, and the possible implementations of the first aspect, the third aspect, the fifth aspect, the seventh aspect, and the ninth aspect. Optionally, the communications apparatus further includes the memory. Optionally, the communications apparatus further includes a communications interface, and the processor is coupled to the communications interface.

In an implementation, the communications apparatus is a terminal device. When the communications apparatus is the terminal device, the communications interface may be a transceiver or an input/output interface.

In another implementation, the communications apparatus is a chip configured in the terminal device. When the communications apparatus is the chip configured in the terminal device, the communications interface may be an input/output interface.

Optionally, the transceiver may be a transceiver circuit. Optionally, the input/output interface may be an input/output circuit.

According to a thirteenth aspect, a communications apparatus is provided, and includes modules or units configured to perform the method according to any one of the second aspect, the fourth aspect, the sixth aspect, the eighth aspect, the tenth aspect, and the possible implementations of the second aspect, the fourth aspect, the sixth aspect, the eighth aspect, and the tenth aspect.

According to a fourteenth aspect, a communications apparatus is provided, and includes a processor. The processor is coupled to a memory, and may be configured to execute instructions in the memory, to implement the method according to any one of the second aspect, the fourth aspect, the sixth aspect, the eighth aspect, the tenth aspect, and the possible implementations of the second aspect, the fourth aspect, the sixth aspect, the eighth aspect, and the tenth aspect. Optionally, the communications apparatus further includes the memory. Optionally, the communications apparatus further includes a communications interface, and the processor is coupled to the communications interface.

In an implementation, the communications apparatus is a network device. When the communications apparatus is the network device, the communications interface may be a transceiver or an input/output interface.

In another implementation, the communications apparatus is a chip configured in the network device. When the communications apparatus is the chip configured in the network device, the communications interface may be an input/output interface.

Optionally, the transceiver may be a transceiver circuit. Optionally, the input/output interface may be an input/output circuit.

According to a fifteenth aspect, a processor is provided, and includes an input circuit, an output circuit, and a processing circuit. The processing circuit is configured to: receive a signal through the input circuit, and transmit a signal through the output circuit, so that the processor performs the method according to any one of the first aspect to the tenth aspect and the possible implementations of the first aspect to the tenth aspect.

In a specific implementation process, the processor may be one or more chips, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal that is output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in this embodiment of this application.

According to a sixteenth aspect, a processing apparatus is provided, and includes a processor and a memory. The processor is configured to read instructions stored in the memory, and may receive a signal by using a receiver, and transmit a signal by using a transmitter, to perform the method according to any one of the first aspect to the tenth aspect and the possible implementations of the first aspect to the tenth aspect.

Optionally, there are one or more processors and one or more memories.

Optionally, the memory may be integrated into the processor, or the memory and the processor are separately disposed.

In a specific implementation process, the memory may be a non-transitory memory, such as a read-only memory (ROM). The memory and the processor may be integrated into one chip, or may be disposed in different chips. A type of the memory and a manner in which the memory and the processor are disposed are not limited in this embodiment of this application.

It should be understood that, a related data exchange process, for example, sending of indication information may be a process of outputting the indication information from the processor, and receiving of indication information may be a process of receiving the indication information by the processor. Specifically, data that is output by the processor may be output to the transmitter, and input data received by the processor may be from the receiver. The transmitter and the receiver may be collectively referred to as a transceiver.

The processing apparatus according to the sixteenth aspect may be one or more chips. The processor in the processing apparatus may be implemented by hardware, or may be implemented by software. When the processor is implemented by hardware, the processor may be a logic circuit, an integrated circuit, or the like. When the processor is implemented by software, the processor may be a general-purpose processor, and is implemented by reading software code stored in the memory. The memory may be integrated into the processor, or may be located outside the processor and exist independently.

According to a seventeenth aspect, a computer program product is provided. The computer program product includes a computer program (which may also be referred to as code or instructions). When the computer program is run, a computer is enabled to perform the method according to any one of the first aspect to the tenth aspect and the possible implementations of the first aspect to the tenth aspect.

According to an eighteenth aspect, a computer-readable medium is provided. The computer-readable medium stores a computer program (which may also be referred to as code or instructions). When the computer program is run on a computer, the computer is enabled to perform the method according to any one of the first aspect to the tenth aspect and the possible implementations of the first aspect to the tenth aspect.

According to a nineteenth aspect, a communications system is provided, and includes the foregoing network device and the foregoing terminal device.

DETAILED DESCRIPTION OF ILLUSTRATIVE EMBODIMENTS

The following describes the technical solutions of this application with reference to the accompanying drawings.

The technical solutions in embodiments of this application may be applied to various communications systems, for example, a long term evolution (LTE) system, an LTE frequency division duplex (FDD) system, an LTE time division duplex (TDD) system, a 5th generation (5G) system, and a new radio (NR) system.

A terminal device in embodiments of this application may be user equipment, an access terminal, a subscriber unit, a subscriber station, a mobile station, a mobile console, a remote station, a remote terminal, a mobile device, a user terminal, a terminal, a wireless communications device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a future 5G network, a terminal device in a future evolved public land mobile network (public land mobile network, PLMN), or the like. This is not limited in embodiments of this application.

A network device in embodiments of this application may be any device having a radio transceiver function. The device includes but is not limited to an evolved NodeB (eNB), a radio network controller (RNC), a NodeB (NB), a base station controller (base station controller, BSC), a base transceiver station (BTS), a home base station (for example, a home evolved NodeB or a home NodeB, HNB), a baseband unit (BBU), an access point (access point, AP) in a wireless fidelity (Wi-Fi) system, a wireless relay node, a wireless backhaul node, a transmission point (TP), a transmission reception point (TRP), or the like, may be a gNB or a transmission point (TRP or TP) in a 5G system, for example, NR, or an antenna panel or a group of antenna panels (including a plurality of antenna panels) of a base station in a 5G system, or may be a network node constituting a gNB or a transmission point, for example, a baseband unit (BBU), a distributed unit (DU), a centralized unit (CU), a CU-CP (control plane), or a CU-UP (user plane).

Figure 1:
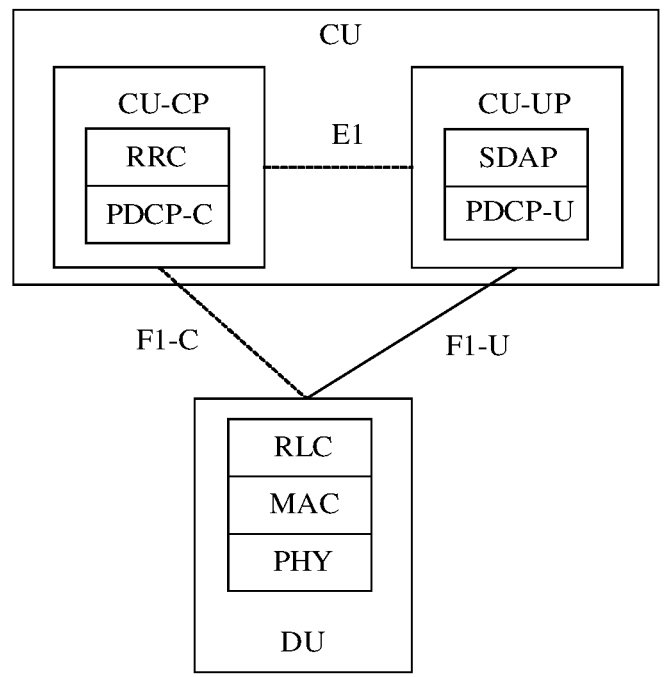
FIG. 1 is a schematic diagram of a base station in a CU/DU split architecture.

In some deployments, a base station (for example, a gNB) may be a base station in a centralized unit (CU)/DU split architecture. For example, FIG. 1 shows a base station in a CU/DU split architecture.

A CU and a DU may be understood as division of a base station from a perspective of logical functions. The CU and the DU may be physically separated or deployed together. A plurality of DUs may share one CU. One DU may be connected to a plurality of CUs. The CU and the DU may be connected through an interface, for example, an F1 interface. The CU and the DU may be obtained through division based on protocol layers of a wireless network. For example, functions of a radio resource control (RRC) layer, a service data adaptation protocol (SDAP) layer, and a packet data convergence protocol (PDCP) layer may be deployed on the CU, and functions of a radio link control (RLC) layer, a media access control (MAC) layer, a physical (PHY) layer, and the like may be deployed on the DU. Functions of the CU may be implemented by one entity, or may be implemented by different entities. For example, the functions of the CU may be further divided. For example, a control plane (CP) is separated from a user plane (UP), in other words, a CU control plane (CU-CP) and a CU user plane (CU-UP) are obtained. For example, the CU-CP and the CU-UP may be implemented by different function entities. The CU-CP and the CU-UP may be coupled to the DU to jointly implement functions of the base station. In a possible manner, the CU-CP is responsible for control plane functions, and mainly includes RRC and PDCP (PDCP-C) for processing an RRC message. The PDCP-C is mainly responsible for encryption and decryption, integrity protection, data transmission, and the like on the RRC message. The CU-UP is responsible for user plane functions, and mainly includes SDAP and PDCP for processing user data. SDAP is mainly responsible for processing data of a core network and mapping a data flow to a bearer. The PDCP-U is mainly responsible for encryption and decryption, integrity protection, header compression, serial number maintenance, data transmission, and the like on the user data. The CU-CP is connected to the CU-UP through an E1 interface. The CU-CP indicates that the base station is connected to the core network through an Ng interface, and is connected to the DU through an F1 control plane (F1-C). The CU-UP is connected to the DU through an F1 user plane (F1-U).

In embodiments of this application, the terminal device or the network device includes a hardware layer, an operating system layer running on the hardware layer, and an application layer running on the operating system layer. The hardware layer includes hardware such as a central processing unit (CPU), a memory management unit (MMU), and a memory (also referred to as a main memory). The operating system may be any one or more computer operating systems that implement service processing through a process, for example, a Linux operating system, a Unix operating system, an Android operating system, an iOS operating system, or a Windows operating system. The application layer includes applications such as a browser, a contact list, word processing software, and instant messaging software. In addition, a specific structure of an execution body of a method provided in embodiments of this application is not specifically limited in embodiments of this application, provided that a program that records code of the method provided in embodiments of this application can be run to perform communication according to the method provided in embodiments of this application. For example, the method provided in embodiments of this application may be performed by the terminal device or the network device, or a functional module that is in the terminal device or the network device and that can invoke and execute the program.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, a computer-readable medium may include but is not limited to a magnetic storage component (for example, a hard disk, a floppy disk, or a magnetic tape), an optical disc (for example, a compact disc (compact disc, CD) or a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a wireless channel, and various other media that can store, include, and/or carry instructions and/or data.

The method provided in this application is applied to a dual connectivity (DC) scenario. For ease of understanding, the DC scenario is first described with reference to FIG. 2 by using an example in which the terminal device is UE and the network device is a base station.

In a wireless network, one UE may communicate with a plurality of base stations, that is, dual connectivity (DC), which is also referred to as multi-radio dual connectivity (MR-DC). The plurality of base stations may be base stations of a same standard (for example, all are 4th generation (4G) base stations, or all are 5G base stations), or may be base stations of different standards (for example, one is a 4th generation (4G) base station, and the other is a 5th generation (5G) base station).

Figure 2:
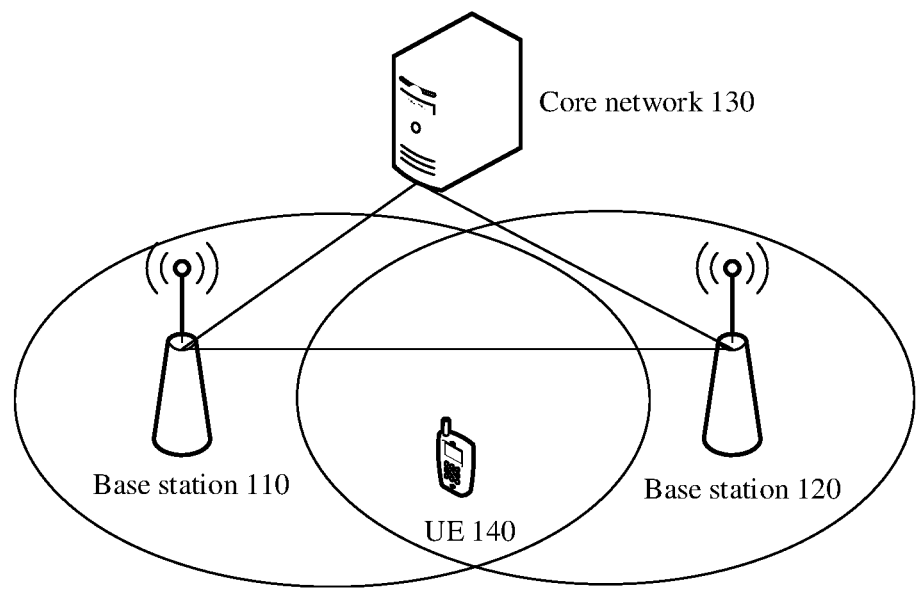
FIG. 2 is a schematic diagram of a DC scenario applied to this application.

For example, FIG. 2 is a schematic diagram of a DC scenario applied to this application. Refer to FIG. 2. UE 140 may communicate with a base station no and a base station 120 by using a DC technology, and the base station no and the base station 120 jointly access a core network 130. The core network 130 may be a 4G core network, or may be a 5G core network.

In DC, a base station that has control plane signaling interaction with the core network is referred to as a master node (master node, MN), and another base station is referred to as a secondary node (SN). The MN is sometimes referred to as a master base station, and the SN is sometimes referred to as a secondary base station.

Scenarios to which this application is applicable include but are not limited to the following DC types: evolved universal terrestrial radio access and new radio dual connectivity (E-UTRA-NR dual connectivity, EN-DC), next generation radio access network evolved universal terrestrial radio access and new radio dual connectivity (NG-RAN E-UTRA-NR dual connectivity, NGEN-DC), new radio and evolved universal terrestrial radio access dual connectivity (NR-E-UTRA dual connectivity, NE-DC), and new radio and new radio dual connectivity (NR-NR dual connectivity, NR-DC).

In the EN-DC, the master base station is an LTE base station (for example, an eNB) connected to a 4G core network, and the secondary base station is an NR base station (for example, a gNB).

In the NGEN-DC, the master base station is an LTE base station connected to a 5G core network, and the secondary base station is an NR base station.

In the NE-DC, the master base station is an NR base station connected to a 5G core network, and the secondary base station is an LTE base station.

In the NR-DC, the master base station is an NR base station connected to a 5G core network, and the secondary base station is an NR base station.

In the DC, serving cells served by the secondary base station are referred to as a secondary cell group (SCG), and the secondary cell group includes a primary SCG cell (PSCell) and one or more optional secondary cells. Cells serve by the master base station are referred to as a master cell group (MCG), and the master cell group includes a primary cell (PCell) and one or more optional secondary cells.

The PCell is an MCG cell deployed at a primary frequency, and the UE performs an initial connection establishment procedure or a connection reestablishment procedure in the cell, or specifies the cell as the PCell in a handover procedure. The PSCell is a cell that is in an SCG cell and in which the UE performs random access when performing a synchronous reconfiguration procedure, or a cell in which the UE initiates initial physical uplink shared channel (physical uplink shared channel, PUSCH) transmission when the UE performs an SCG change and does not require a random access procedure. For detailed descriptions, refer to the protocols 3GPP TS36.331 and 38.331.

It should be understood that the application scenario of this application is not limited to the foregoing DC scenario. This application is further applicable to a DC scenario of another system, for example, a DC scenario including a 5G base station and Wi-Fi, or a DC scenario including a base station deployed as a licensed spectrum and a base station deployed as an unlicensed spectrum.

The following briefly describes some technologies in this application.

1. CHO Mechanism

In a conventional handover procedure, mobility management of a terminal device in a connected mode is controlled by a network device. To be specific, the network device sends a handover message to indicate a cell to which the terminal device is to be handed over and how to perform handover. Specifically, a source network device sends the handover message to the terminal device, to control the terminal device to be handed over from a source cell to a target cell. After receiving the handover message, the terminal device accesses the target cell based on content included in the handover message. Therefore, successful sending of the handover message is a necessary condition for ensuring successful handover in a conventional handover mechanism. However, in an LTE system or an NR system, the handover message fails to be sent because of fast attenuation of signal quality, fast movement of the terminal device, blocking of an object, long duration of handover preparation, and the like. Consequently, a handover failure is caused, and a handover success rate is reduced. In addition, in the conventional handover procedure, the network device usually determines, based on signal quality reported by the terminal device, whether to indicate the terminal device to perform handover. For example, when the terminal device detects that signal quality of a neighboring cell is better than signal quality of a current serving cell by a specific threshold, the terminal device reports a measurement result. However, in the LTE system or the NR system, a measurement report fails to be sent because of fast attenuation of signal quality, fast movement of the terminal device, blocking of an object, long duration of handover preparation, and the like. Consequently, a handover failure is caused, and a handover success rate is reduced.

In view of the foregoing problems, a CHO mechanism is proposed to improve the handover success rate.

In the CHO mechanism, the source cell sends CHO configuration information to the terminal device when quality of a source link is good. The CHO configuration information may include a CHO trigger condition and information about one or more candidate cells. The information about the candidate cell may include a cell global identifier (CGI) of the candidate cell, or a physical cell identifier (PCI) of the candidate cell and frequency information corresponding to the candidate cell. After receiving the CHO configuration information, the terminal device determines, based on the CHO configuration information, whether the candidate cell meets the CHO trigger condition, and uses a candidate cell meeting the CHO trigger condition as a target cell. Then, the terminal device performs a random access procedure with the determined target cell. When random access is successfully completed, the terminal device sends an RRC message (for example, an RRC reconfiguration complete message) to the target cell, to notify the target cell that conditional handover is completed.

2. MCG Fast Recovery

When an RLF occurs in an MCG, a terminal device detects whether an SCG fails. If the terminal device does not detect that the SCG fails, the terminal device may initiate an MCG fast recovery procedure. The MCG fast recovery procedure roughly includes: The terminal device sends an MCG failure message to an MN via an SN, and the MN performs a specific operation based on the MCG failure message, for example, initiates RRC reconfiguration or cell handover, to recover the MCG. If the terminal device detects that the SCG fails, the terminal device initiates an RRC reestablishment procedure.

3. RRC Reconfiguration

The RRC reconfiguration, that is, RRC connection reconfiguration, is used to modify an RRC connection, for example, one or more of the following: setting up, modifying, or releasing a radio bearer (radio bearer, RB), performing handover, or setting up, modifying, or releasing measurement. After receiving an RRC (or RRC connection) reconfiguration message sent by a network device (for example, an MN), a terminal device performs a corresponding operation based on content in the RRC reconfiguration message, for example, performs handover. If the terminal device successfully performs the corresponding operation, the terminal device sends an RRC reconfiguration complete message to the network device, to complete the RRC reconfiguration.

4. RRC Reestablishment

When a wireless connection fails, for example, an RLF or a reconfiguration failure occurs, a terminal device may initiate an RRC reestablishment procedure in an RRC connected mode to recover an RRC connection.

Figure 3:
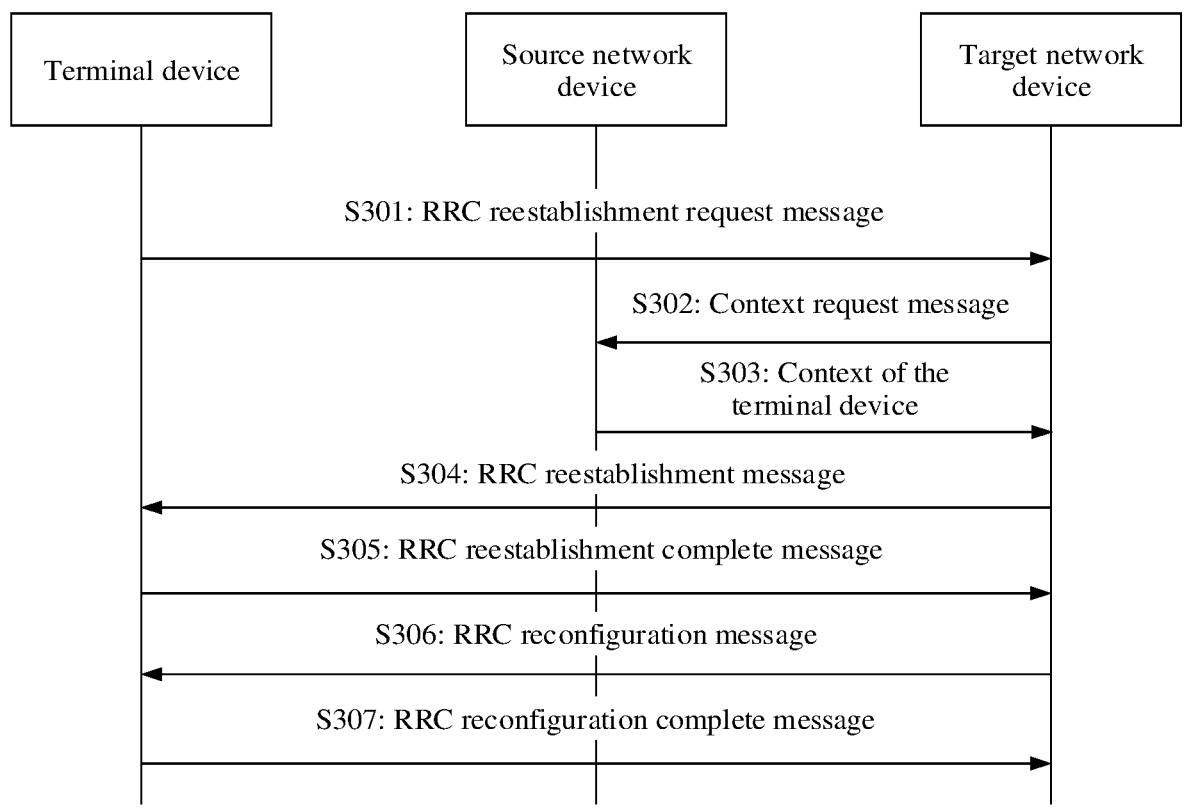
FIG. 3 is a schematic flowchart of an RRC reestablishment procedure.

FIG. 3 shows a rough RRC reestablishment procedure performed when a terminal device is connected to a 5G core network. The RRC reestablishment procedure shown in FIG. 3 mainly involves interaction between the terminal device and a network device, but interaction between the network device and a core network device is not shown herein.

S301: The terminal device sends an RRC reestablishment request message to a target network device.

It should be understood that a source network device represents a network device corresponding to a source cell, and the target network device is a network device corresponding to a target cell.

In an RRC reestablishment procedure in the conventional technology, before the terminal device sends an RRC reestablishment request message, the terminal device performs the following behavior: suspending all RBs except a signaling radio bearer 0 (SRB 0), resetting a MAC layer, releasing a secondary cell in an MCG, releasing SCG configuration, and performing a cell selection procedure.

The terminal device sends the RRC reestablishment request message only when cells of a same standard are selected as cells of the terminal device.

The terminal device enters an RRC idle mode (RRC_IDLE) when cells of different standards are selected as cells of the terminal device.

Before sending the RRC reestablishment request message, the terminal device may further perform the following behavior:

reestablishing PDCP corresponding to a signaling radio bearer 1 (SRB 1), reestablishing RLC corresponding to the SRB 1, and restoring the SRB 1.

S302: The target network device sends a context request message to the source network device based on the RRC reestablishment request message.

S303: After receiving the context request message sent by the target network device, the source network device sends a context of the terminal device to the target network device.

S304: After receiving the context of the terminal device, the target network device sends an RRC reestablishment message to the terminal device.

The RRC reestablishment message is used to reestablish the SRB 1 and update a cipher key. After receiving the RRC reestablishment message, the terminal device considers that a current cell is a primary cell PCell, stores the cipher key carried in the RRC reestablishment message, and restores SRB encryption and integrity protection.

S305: The terminal device returns an RRC reestablishment complete message to the target network device, where the message is used to determine that RRC reestablishment is successfully completed.

S306: The target network device sends an RRC reconfiguration message to the terminal device.

The target network device may use the RRC reconfiguration message to carry some information to indicate the terminal device to reconfigure an SRB 2 and a data radio bearer (DRB).

It should be noted that there is no strict sequence between steps S305 and S306.

S307: The terminal device returns the RRC reconfiguration complete message to the target network device.

Then, the target network device may request data transfer from the source network device, and the source network device transfers, to a target base station, downlink data packets that have not been successfully sent to the terminal device and/or uplink data packets that have been correctly received by the source network device but are received out of order. The target base station may send the transferred downlink data packets to the terminal device. After the target network device or the like correctly receives another data packet from the terminal device, when the target network device or the like can submit the transferred out-of-order uplink data packets to an upper layer in sequence (for example, a PDCP layer of the target network device may submit the uplink data packets to the upper layer in sequence), the target network device or the like submits the uplink data packets to the upper layer.

Only the messages shown in FIG. 3 are briefly described above. For specific meanings represented by these messages and content included in these messages, refer to an existing protocol.

It should be understood that if the source cell and the target cell correspond to a same network device, S302 and S303 may not be performed.

In the RRC reestablishment procedure in the conventional technology, the target cell and the source cell that are selected by the terminal device may not be of a same standard, for example, one is a 4G cell and the other is a 5G cell. In this case, the terminal device enters an RRC idle mode, and consequently communication of the terminal device is interrupted. In addition, even if the target cell and the source cell are of a same standard, if there is no direct Xn/X2 interface between the target network device and the source network device, the source network device cannot send the context of the terminal device to the target network device, and the source network device cannot transfer a data packet to the target network device. Consequently, a packet loss is caused. Therefore, initiating the RRC reestablishment procedure in the conventional technology needs to be avoided as far as possible to recover the wireless connection.

In this way, this application provides two mechanisms to reduce a probability that the terminal device initiates the RRC reestablishment procedure in the conventional technology, to reduce a probability that the communication of the terminal device is interrupted, and improve user experience.

Mechanism 1:

When the terminal device detects that a wireless connection fails, the terminal device preferentially performs cell selection. If a selected cell is a candidate cell pre-configured by the MN, the terminal device accesses the selected cell, or if the selected cell is not the candidate cell, the terminal device sends a master cell group MCG failure message to the MN via the SN when the terminal device does not detect that an SCG fails.

As described above, in a conventional handover procedure, a handover failure may occur due to sending of a measurement report or a handover command. In this mechanism, when the selected cell is the candidate cell, the terminal device accesses the selected cell. Because information about the candidate cell has been pre-configured by the MN, handover is performed without a need to send the measurement report or wait for the handover command, so that a success rate of accessing the selected cell can be improved. In addition, when the cell selected by the terminal device is not the candidate cell, the terminal device sends an MCG failure message to the MN via the SN, to trigger the MN to recover the wireless connection in an RRC reconfiguration procedure or a cell handover procedure, so as to avoid RRC reestablishment in the conventional technology.

Compared with the conventional technology in which communication interruption or a packet loss may occur due to an RRC reestablishment procedure, the RRC reconfiguration procedure and the cell handover procedure in this embodiment do not result in interruption to communication of the terminal device or a packet loss. Therefore, according to the method provided in this application, the RRC reestablishment procedure is avoided, so that the communication interruption and the packet loss can be avoided, to improve user experience.

Mechanism 2:

When the terminal device detects that the wireless connection fails, if the terminal device does not detect that an SCG fails, the terminal device sends an MCG failure message to the MN via the SN. If the terminal device detects that the SCG fails, the terminal device performs cell selection, and when a selected cell is a candidate cell pre-configured by the MN, the terminal device accesses the selected cell.

According to the mechanism, when the terminal device detects that the wireless connection fails, if the terminal device does not detect that the SCG fails, the terminal device sends the MCG failure message to the MN via the SN, to trigger the MN to recover the wireless connection in an RRC reconfiguration procedure or a cell handover procedure, so as to avoid RRC reestablishment in the conventional technology. In addition, if the terminal device detects that the SCG fails, the terminal device may access the candidate cell when selecting the candidate cell, to further avoid an RRC reestablishment procedure in the conventional technology. According to the foregoing method, the RRC reestablishment procedure is avoided, so that communication interruption and a packet loss can be avoided, to improve user experience.

In this application, whether the terminal device specifically uses Mechanism 1 or Mechanism 2 to recover the wireless connection may be specified in a protocol or may be indicated by the MN.

For example, in Manner 1, the protocol specifies that the terminal device uses Mechanism 1 to recover the wireless connection. Certainly, the protocol may also specify that the terminal device does not use Mechanism 1 but uses Mechanism 2 to recover the wireless connection.

In Manner 2, the MN indicates the terminal device to use Mechanism 1 to recover the wireless connection. Certainly, the MN may also indicate the terminal device not to use Mechanism 1 but to use Mechanism 2 to recover the wireless connection.

For example, the MN may send first indication information to the terminal device, where the first indication information may be used to indicate the terminal device to use Mechanism 1 to recover the wireless connection, or the first indication information may be used to indicate the terminal device to preferentially perform cell selection when the terminal device detects that the wireless connection fails, and access a selected cell when the selected cell is a candidate cell.

For another example, the MN may send third indication information to the terminal device, where the third indication information may be used to indicate the terminal device to use Mechanism 2 to recover the wireless connection, or the third indication information may be used to indicate the terminal device to preferentially send an MCG failure message to the MN via the SN when the terminal device detects that the wireless connection fails.

In Manner 3, a specific condition is specified in the protocol, and the protocol specifies that when the condition is satisfied, which one of Mechanism 1 and Mechanism 2 is used by the terminal device to recover the wireless connection, or when the condition is not satisfied, which one of Mechanism 1 and Mechanism 2 is used by the terminal device to recover the wireless connection.

In Manner 4, the MN indicates a specific condition, and the protocol specifies that when the condition is satisfied, which one of Mechanism 1 and Mechanism 2 is used by the terminal device to recover the wireless connection, or when the condition is not satisfied, which one of Mechanism 1 and Mechanism 2 is used by the terminal device to recover the wireless connection.

In Manner 5, the MN indicates a specific condition, and the MN indicates that when the condition is satisfied, which one of Mechanism 1 and Mechanism 2 is used by the terminal device to recover the wireless connection, or when the condition is not satisfied, which one of Mechanism 1 and Mechanism 2 is used by the terminal device to recover the wireless connection.

All conditions in Manner 3, Manner 4, and Manner 5 may be denoted as a determining condition #1.

In this application, if the determining condition #1 is satisfied, the terminal device uses one of Mechanism 1 and Mechanism 2, or if the determining condition #1 is not satisfied, the terminal device uses the other one of Mechanism 1 and Mechanism 2. For example, if the determining condition #1 is satisfied, the terminal device uses Mechanism 1, or if the determining condition #1 is not satisfied, the terminal device uses Mechanism 2. Descriptions are provided below by using examples.

Example 1

The determining condition #1 may be a first condition. If the first condition is met, or the first condition is satisfied, the terminal device uses Mechanism 1, or if the first condition is not met, the terminal device uses Mechanism 2.

For example, with reference to Manner 4, the MN may send first indication information to the terminal device, where the first indication information may include a first condition, and the first condition is used to indicate the terminal device to use a first mechanism when the first condition is met, or the first condition is used to indicate the terminal device to preferentially perform cell selection when the terminal device detects that the wireless connection fails and the first condition is met, and access a selected cell when the selected cell is the candidate cell.

For example, with reference to Manner 5, the MN may send first indication information to the terminal device, where the first indication information may include a first condition, and the first indication information is further used to indicate the terminal device to use a first mechanism when the first condition is met, or the first indication information is used to indicate the terminal device to preferentially perform cell selection when the terminal device detects that the wireless connection fails and the first condition is met, and access a selected cell when the selected cell is the candidate cell.

For example, the first condition may be that a cell whose signal quality is greater than a first threshold exists in the candidate cell pre-configured by the MN. In this case, if the cell whose signal quality is greater than the first threshold exists in the candidate cell, the terminal device uses Mechanism 1, or if the cell whose signal quality is greater than the first threshold does not exist in the candidate cell, the terminal device uses Mechanism 2.

For another example, the first condition may be that signal quality of the SN is less than or equal to a second threshold.

In this case, if the signal quality of the SN is less than or equal to the second threshold, the terminal device uses Mechanism 1, or if the signal quality of the SN is greater than the second threshold, the terminal device uses Mechanism 2.

For example, the signal quality of the SN in this application may be signal quality of a PSCell. In addition, signal quality in this application may be one or more of reference signal received power (RSRP), reference signal received quality (RSRQ), and a signal to interference plus noise ratio (SINR).

Example 2

The determining condition #1 may be a third condition. If the third condition is met, or the third condition is satisfied, the terminal device uses Mechanism 2, or if the third condition is not met, the terminal device uses Mechanism 1.

For example, with reference to Manner 4, the MN may send third indication information to the terminal device, where the third indication information may include a third condition, and the third condition is used to indicate the terminal device to use a second mechanism when the third condition is met, or the third condition is used to indicate the terminal device to preferentially send an MCG failure message to the MN via the SN when the terminal device detects that the wireless connection fails and the third condition is met.

For example, with reference to Manner 5, the MN may send third indication information to the terminal device, where the third indication information may include a third condition, and the third indication information is further used to indicate the terminal device to use a second mechanism when the third condition is met, or the third indication information is used to indicate the terminal device to preferentially send an MCG failure message to the MN via the SN when the terminal device detects that the wireless connection fails and the third condition is met.

For example, the third condition may be that signal quality of the SN is greater than a second threshold. In this case, if the signal quality of the SN is greater than the second threshold, the terminal device uses Mechanism 2, or if the signal quality of the SN is less than or equal to the second threshold, the terminal device uses Mechanism 1.

Figure 4:
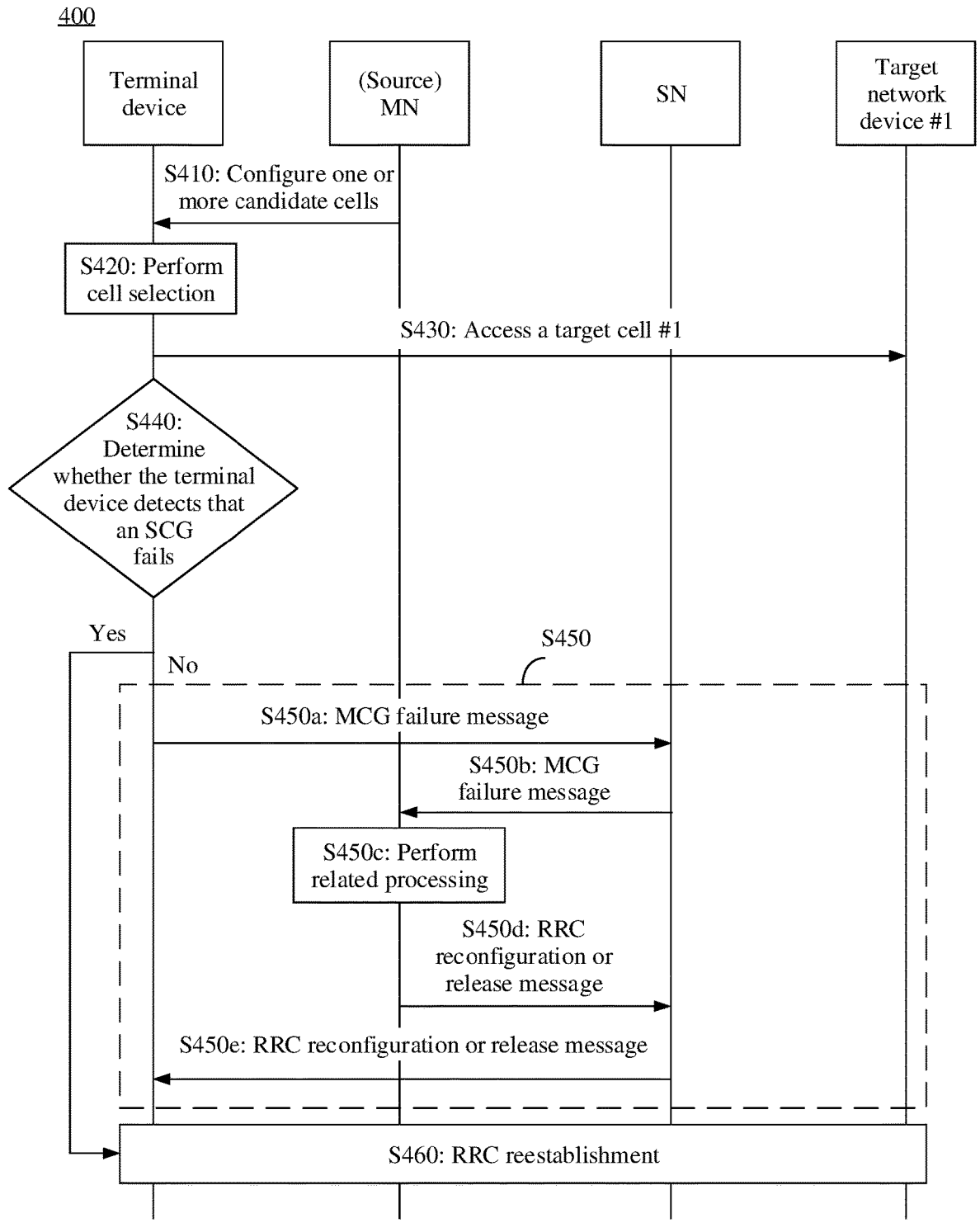
FIG. 4 is a schematic diagram of a communication method according to this application.
Figure 5:
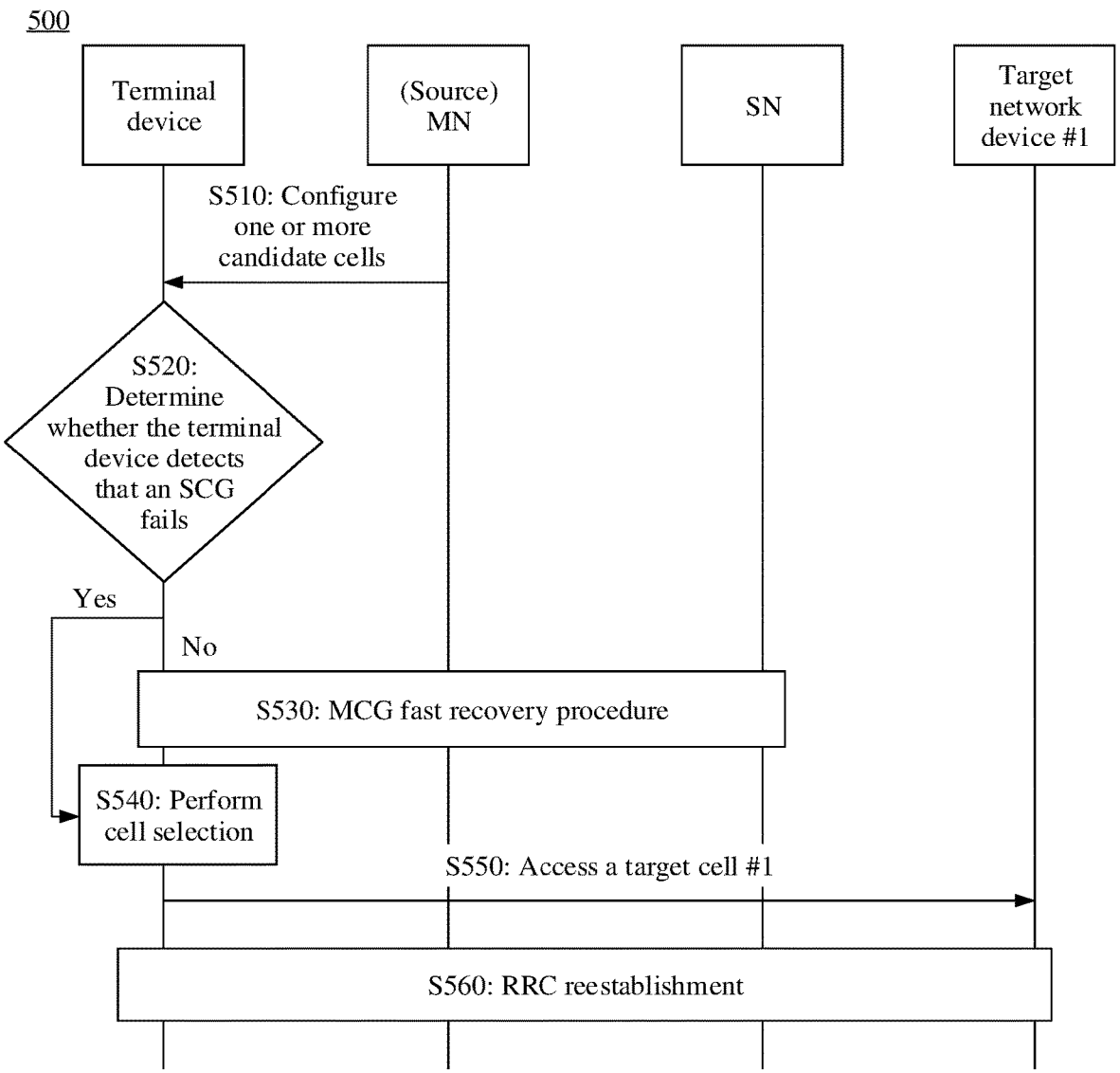
FIG. 5 is a schematic flowchart of a communication method according to this application.

The following describes in detail Mechanism 1 and Mechanism 2 respectively with reference to communication methods shown in FIG. 4 and FIG. 5.

It should be understood that, when the method described below is applied to the system in FIG. 2, a terminal device may correspond to the UE 140, an MN may correspond to one of the base station no and the base station 120, and an SN may correspond to the other one of the base station no and the base station 120.

FIG. 4 shows a communication method 400. The method 400 corresponds to Mechanism 1. The following describes steps of the method shown in FIG. 4.

S410: An MN sends configuration information to a terminal device.

The configuration information may include information about one or more candidate cells. The information about the candidate cell may include, for example, a cell global identifier (CGI) of the candidate cell, or a physical cell identifier (PCI) of the candidate cell and frequency information corresponding to the candidate cell.

For example, the configuration information may be CHO configuration information. For a specific form of the CHO configuration information, refer to the foregoing descriptions in the CHO mechanism or the conventional technology.

S420: When detecting that a wireless connection fails, the terminal device performs cell selection.

In this application, that the wireless connection fails may include one or more of the following cases:

(1) An RLF occurs in an MCG.

That the RLF occurs in the MCG includes one or more of the following: (a) A problem at a physical layer is detected. For example, when an RRC layer of the terminal device receives N consecutive out-of-synchronization indications of a primary cell PCell from a bottom layer, and does not receive M consecutive synchronization indications of the primary cell PCell from the bottom layer in a subsequent period of time. (b) A random access procedure in the MCG fails. (c) A maximum quantity of retransmissions at an MCG RLC layer is reached.

(2) The terminal device starts a timer T304 when the terminal device fails to complete RRC reconfiguration that carries an indication that the terminal device needs to perform synchronization and that is configured by the MCG (for example, when the terminal device receives a reconfiguration message carrying an indication that the terminal device needs to perform synchronization) (for example, the RRC reconfiguration message carries a reconfigurationWithSync information element). The terminal device cancels T304 if the terminal device successfully performs a random access procedure in a target cell delivered in the RRC reconfiguration message. If the timer T304 expires, it is considered that the terminal device fails to complete RRC reconfiguration carrying the indication that the terminal device needs to perform synchronization.

(3) RRC reconfiguration fails. For example, the terminal device cannot comply with some configurations in a received RRC reconfiguration message.

(4) Integrity check performed by the terminal device on a received data packet fails. To be specific, integrity check performed by a PDCP layer of the terminal device on a data packet received over an SRB 1 or an SRB 2 fails.

(5) Switching from a current wireless communications standard to another communications standard fails.

For example, when one or more of the foregoing cases occur, or the wireless connection fails due to another problem, the terminal device may perform cell selection by using a criterion S.

A formula of the criterion S is: $S_{rxlev} > 0$. To be specific, if an S value of a cell is greater than 0, it indicates that the cell is a suitable cell. A formula for calculating $S_{rxlev}$ is as follows:

$$S_{rxlev} = Q_{rxlevmeas} - (Q_{rxlevmin} - Q_{rxlevminoffset}) - P_{compensation}$$

$S_{rxlev}$ is a cell selection receive level value obtained through calculation.

$Q_{rxlevmeas}$ is a received signal strength value obtained by the terminal device through measurement, where the value is measured reference signal received power (RSRP).

$Q_{rxlevmin}$ is a minimum received signal strength value required by the cell.

$P_{compensation}$ is a larger value in (PEMAX−PUMAX) or 0, PEMAX is maximum allowed transmit power that is set by a system when the terminal device accesses the cell, and PUMAX is maximum output power specified based on a level of the terminal device.

$Q_{rxlevminoffset}$: This parameter is valid only when the terminal device normally camps on a virtual private mobile network (VPMN) and periodically searches for a high-priority public land mobile network (PLMN) for cell selection evaluation, and this parameter has a specific offset of $Q_{rxlevmin}$.

It should be noted that due to evolution of the communication protocol versions, the formula of the criterion S and the formula for calculating $S_{rxlev}$ may change due to some reasons. The formulas provided herein are merely examples, and these examples constitute no limitation on the formulas.

It should be noted that the cell selection performed by the terminal device may not be cell selection performed in an RRC reestablishment procedure (for example, the terminal device directly performs cell selection after detecting that the wireless connection fails), or may be cell selection performed in RRC reestablishment. For example, in the protocol, the cell selection in this step is performed in RRC reestablishment, but the RRC reestablishment is different from RRC reestablishment in the conventional technology. For example, the terminal device does not perform at least one of the following behavior: suspending all RBs (except an SRB 0) and releasing SCG configuration.

In S420, the terminal device performs S430 if the cell selected by the terminal device is the candidate cell, or the terminal device performs S440 if the cell selected by the terminal device is not the candidate cell.

Optionally, the terminal device performs S430 if the cell selected by the terminal device is the candidate cell and a fifth condition is met. Optionally, the terminal device still performs S440 if the terminal device selects the candidate cell, but the fifth condition is not met.

For example, the MN may indicate the terminal device to preferentially perform cell selection when the selected cell is the candidate cell and the fifth condition is met, and access the selected cell when the selected cell is the candidate cell. For example, the fifth condition may be that a candidate cell whose signal quality is greater than a specific threshold exists, or signal quality of the SN is less than or equal to a specific threshold.

It should be understood that the fifth condition may be configured by the MN, or may be specified in a protocol. This is not limited in this application.

S430: The terminal device accesses the selected cell.

The cell selected by the terminal device in S420 is referred to as a target cell #1 below. In other words, if the target cell #1 is one of one or more candidate cells configured by the MN by using the configuration information, the terminal device accesses the target cell #1.

It should be understood that if the target cell #1 corresponds to (or belongs to) the MN, in other words, the target cell #1 belongs to an MCG of the MN, the terminal device accesses the MN in S430. If the target cell #1 and a source cell (that is, a cell in which a wireless connection to the terminal device fails) correspond to different network devices (for example, base stations), the MN may be a source network device or a source MN, and the network device corresponding to the target cell #1 is a target network device, denoted as a target network device #1 for ease of differentiation. FIG. 4 shows a case in which the target cell #1 and the source cell correspond to different network devices.

It should be further understood that if the target cell #1 and the source cell correspond to the different network devices, after the terminal device accesses the target cell #1, the target network device #1 may further indicate the source MN to release a context of the terminal device. In addition, after the terminal device accesses the target cell #1, interaction between the target network device #1 and a core network device is further involved. For content of the interaction, refer to content of interaction between the target network device and the core network device in a cell handover procedure in the conventional technology. For details, refer to the cell handover procedure in the conventional technology. The details are not described herein.

For example, that the terminal device accesses the target cell #1 may be specifically that the terminal device initiates a random access procedure, and sends an RRC reconfiguration complete message to the target cell #1. However, this is not limited in this application. For example, alternatively, that the terminal device accesses the target cell #1 may be specifically that the terminal device directly sends, without a random access procedure, an RRC reconfiguration complete message to the target cell #1 based on uplink grant information sent by the target cell #1.

Optionally, if accessing the target cell #1 by the terminal device fails, the terminal device may perform S440 and subsequent corresponding steps.

For example, the MN may send indication information to the terminal device (for example, before S430, for example, in S410), to indicate the terminal device to send an MCG failure message to initiate an MCG fast recovery procedure when accessing the target cell #1 fails, for example, when the terminal device does not receive an RRC reconfiguration complete message and does not detect that an SCG fails.

S440: The terminal device determines whether the terminal device detects that an SCG fails.

For example, that the SCG fails may include one or more of the following:

(1) A problem at a physical layer is detected. For example, when an RRC layer of the terminal device receives N consecutive out-of-synchronization indications of a primary SCG cell PSCell from a bottom layer, and does not receive M consecutive synchronization indications of the primary SCG cell PSCell from the bottom layer in a subsequent period of time.

(2) A random access procedure in the SCG fails.

(3) A maximum quantity of retransmissions at an SCG RLC layer is reached.

(4) Change of the SN fails.

(5) Configuration of an SRB3 fails.

(6) Integrity check on the SRB3 fails. To be specific, integrity check performed by a PDCP layer of the terminal device on a data packet received over the SRB3 fails.

In S440, the terminal device performs S450 if the terminal device does not detect that the SCG fails, or optionally, the terminal device performs S460 if the terminal device detects that the SCG fails.

In an example, the MN may indicate the terminal device to determine whether to perform S450 when the target cell #1 is not the candidate cell and the terminal device does not detect that the SCG fails.

For example, before S440, the source MN may send second indication information to the terminal device, where the second indication information may be any one of the following forms:

(1) The second indication information is used to indicate the terminal device to send the MCG failure message to the MN via the SN when the selected cell is not the candidate cell. In this way, the terminal device may perform S450 when the target cell #1 is not the candidate cell and the terminal device does not detect that the SCG fails.

(2) The second indication information includes a second condition, and the second condition is used to indicate the terminal device to send the MCG failure message to the MN via the SN when the selected cell is not the candidate cell and the second condition is met.

Specifically, the MN indicates the second condition, and a protocol specifies that when the selected cell is not the candidate cell and the second condition is met, if the terminal device does not detect that the SCG fails, the terminal device may send the MCG failure message to the MN via the SN.

For example, the second condition may be that signal quality of the SN is greater than a fourth threshold, or may be that signal quality of the target cell is less than a third threshold.

(3) The second indication information includes a second condition, and the second indication information is used to indicate the terminal device to send the MCG failure message to the MN via the SN when the selected cell is not the candidate cell and the second condition is met.

To be specific, the MN indicates the second condition, and the MN indicates the terminal device to send the MCG failure message to the MN via the SN when the selected cell is not the candidate cell and the second condition is met, and if the terminal device does not detect that the SCG fails.

The second condition is described above. Details are not described herein again.

Optionally, the configuration information in S410, the first indication information described above, and the second indication information herein may be carried in same signaling, or may be carried in different signaling. This is not limited in this application.

S450: The terminal device initiates an MCG fast recovery procedure.

The terminal device initiates the MCG fast recovery procedure to attempt to recover the wireless connection. The MCG fast recovery procedure may include S450a to S450e.

S450a: The terminal device sends the MCG failure message to the SN.

Optionally, the MCG failure message may be carried in an RRC message of the SN, for example, an SRB3. Alternatively, the MCG failure message may be sent through a branch of an SRB of the MCG on the SN side, for example, a branch of a split SRB 1 in the SCG.

S450b: The SN sends the MCG failure message to the MN.

S450c: The MN performs related processing.

For example, the MN may perform RRC reconfiguration on the terminal device, or indicate the terminal device to perform cell handover. Optionally, the MN may further release the terminal device.

S450d: The MN sends an RRC reconfiguration message or an RRC release message to the SN.

The MN may indicate the SN to send the message to the terminal device by using the split SRB 1 or the SRB 3.

If the MN indicates the terminal device to perform cell handover, optionally, the RRC reconfiguration message may include handover information, to indicate the terminal device to access a target cell #2. It should be noted that the target cell #2 is a cell determined by the MN, and may be different from the target cell #1. For example, the terminal device may use the sent MCG failure message to carry a cell measurement report, and the MN may determine the target cell #2 based on the measurement report.

If the target cell #2 and the source cell correspond to different network devices, the MN in S450 is a source MN, and the network device corresponding to the target cell #2 is a target network device, denoted as a target network device #2. The target network device #2 and the target network device #1 may be the same or different. In addition, in this scenario, before the source MN sends the RRC reconfiguration message or the RRC release message to the SN, the source MN sends a handover request message to the target network device #2, and the target network device #2 feeds back a handover request response message to the source MN, where the handover request response message carries the RRC reconfiguration message sent by the target network device #2 to the terminal device. The source MN sends, to the SN, the RRC reconfiguration message sent by the target network device #2 to the terminal device.

If the MN determines to send the RRC release message to the terminal device, the MN sends the RRC release message to the SN.

Optionally, the MN sends the RRC reconfiguration message or the RRC release message to the SN before the MN sends an SN release message to the SN. Optionally, the MN sends the SN release message to the SN only after the SN feeds back, to the MN, the RRC reconfiguration message sent by the MN to the SN or the RRC release message has been successfully sent to the terminal device.

S450e: The SN sends the RRC reconfiguration message or the RRC release message to the terminal device.

Optionally, the SN may send the message by using the split SRB 1 or the SRB 3.

It should be noted that, this means that the SN sends, to the UE, the RRC reconfiguration message or the RRC release message sent by the MN to the SN.

Optionally, if the SN sends the RRC reconfiguration message to the terminal device, after S450e, the method may further include: After receiving the RRC reconfiguration message sent by the SN, the terminal device sends an RRC reconfiguration complete message to the target network device #2.

S460: The terminal device performs RRC reestablishment.

For an RRC reestablishment procedure, refer to FIG. 3. In FIG. 3, the source network device corresponds to the source MN herein, and the target network device corresponds to the target network device #1 herein.

According to the communication method provided in this application, when the selected cell is the candidate cell, the terminal device accesses the selected cell. Because the information about the candidate cell has been pre-configured by the MN, handover is performed without a need to send a measurement report or wait for a handover command, so that a success rate of accessing the selected cell can be improved. In addition, when the cell selected by the terminal device is not the candidate cell, the terminal device sends the MCG failure message to the MN via the SN, to trigger the MN to recover the wireless connection in an RRC reconfiguration procedure or a cell handover procedure, so as to avoid RRC reestablishment in the conventional technology. Compared with the conventional technology in which communication interruption or a packet loss may occur due to an RRC reestablishment procedure, the RRC reconfiguration procedure and the cell handover procedure in this embodiment do not result in interruption to communication of the terminal device or a packet loss. Therefore, according to the method provided in this application, the RRC reestablishment procedure is avoided, so that the communication interruption and the packet loss can be avoided, to improve user experience.

The content that has been described above, for example, descriptions that the wireless connection fails, is not described below again.

FIG. 5 shows another communication method 500. The method 500 corresponds to Mechanism 2. The following describes steps of the method shown in FIG. 5.

S510: An MN sends configuration information to a terminal device. This step is the same as S410. For details, refer to S410.

S520: When detecting that a wireless connection fails, the terminal device determines whether the terminal device detects that an SCG fails. In S520, the terminal device performs S530 if the terminal device does not detect that the SCG fails, or the terminal device performs S540 if the terminal device detects that the SCG fails.

For example, the MN may indicate the terminal device to determine whether to perform S540 when the terminal device detects that the SCG fails.

For example, before S540, the MN may send fourth indication information to the terminal device, where the fourth indication information may be any one of the following forms:

(1) The fourth indication information is used to indicate the terminal device to access a candidate cell when the terminal device cannot send an MCG failure message to the MN via the SN.

That "the terminal device cannot send the MCG failure message to the MN via the SN" means that the terminal device detects that the SCG fails. That "the terminal device may access the candidate cell" means that the terminal device may perform cell selection, and access the candidate cell if a selected cell is the candidate cell.

(2) The fourth indication information includes a fourth condition, and the fourth condition is used to indicate the terminal device to access a candidate cell when the terminal device cannot send an MCG failure message to the MN via the SN and the fourth condition is met.

Specifically, the MN indicates the fourth condition, and a protocol specifies that the terminal device may access the candidate cell when the terminal device cannot send the MCG failure message to the MN via the SN and the fourth condition is met.

For example, the fourth condition may be that a candidate cell whose signal quality is greater than a fifth threshold exists.

(3) The fourth indication information includes a fourth condition, and the fourth indication information is used to indicate the terminal device to access a candidate cell when the terminal device cannot send an MN failure message to the master node via the SN and the fourth condition is met.

To be specific, the MN indicates the fourth condition, and the MN indicates the terminal device to access the candidate cell when the terminal device cannot send the MN failure message to the master node via the SN and the fourth condition is met.

Optionally, the configuration information in S510, the third indication information described above, and the fourth indication information herein may be carried in same signaling, or may be carried in different signaling. This is not limited in this application.

S530: The terminal device initiates an MCG fast recovery procedure.

Specifically, the terminal device sends an SCG failure message to the MN via the SN, to initiate the MCG fast recovery procedure.

For a specific process of the MCG fast recovery procedure, refer to the foregoing descriptions of S450. Details are not described herein again.

Optionally, if the terminal device does not receive a response to the SCG failure message from the MN, the terminal device may perform S540 and subsequent corresponding operations. For example, when initiating the MCG fast recovery procedure, the terminal device may start a timer. If the terminal device has not received an RRC reconfiguration message or an RRC release message when the timer expires, the terminal device may perform S540 and the subsequent corresponding operations.

For example, the MN may indicate the terminal device to perform S540 and the subsequent corresponding operations when the terminal device does not receive the response to the SCG failure message from the MN. For example, alternatively, the MN performs indication by using the fourth indication information, or the MN may perform indication by using another message.

S540: The terminal device performs cell selection.

For example, the terminal device may perform cell selection by using a criterion S. For details, refer to descriptions of the criterion S in S420.

It should be noted that the cell selection performed by the terminal device may not be cell selection performed in an RRC reestablishment procedure, or may be cell selection performed in RRC reestablishment. Detailed descriptions are the same as descriptions in S420.

In S540, the terminal device performs S550 if the cell selected by the terminal device is the candidate cell, or optionally, the terminal device performs S560 if the cell selected by the terminal device is not the candidate cell.

S550: The terminal device accesses the selected cell.

This step is the same as S430. For details, refer to S430.

S560: The terminal device performs RRC reestablishment.

This step is the same as S460. For details, refer to S460.

According to the method provided in this application, when the terminal device detects that the wireless connection fails, if the terminal device does not detect that the SCG fails, the terminal device sends the MCG failure message to the MN via the SN, to trigger the MN to recover the wireless connection in an RRC reconfiguration procedure or a cell handover procedure, so as to avoid RRC reestablishment in the conventional technology. In addition, if the terminal device detects that the SCG fails, the terminal device may access the candidate cell when selecting the candidate cell, to further avoid an RRC reestablishment procedure in the conventional technology. According to the foregoing method, the RRC reestablishment procedure in the conventional technology is avoided, so that communication interruption and a packet loss can be avoided, to improve user experience.

This application further provides two other methods to avoid RRC reestablishment in the conventional technology. Descriptions are provided below with reference to FIG. 6 and FIG. 7.

Figure 6:
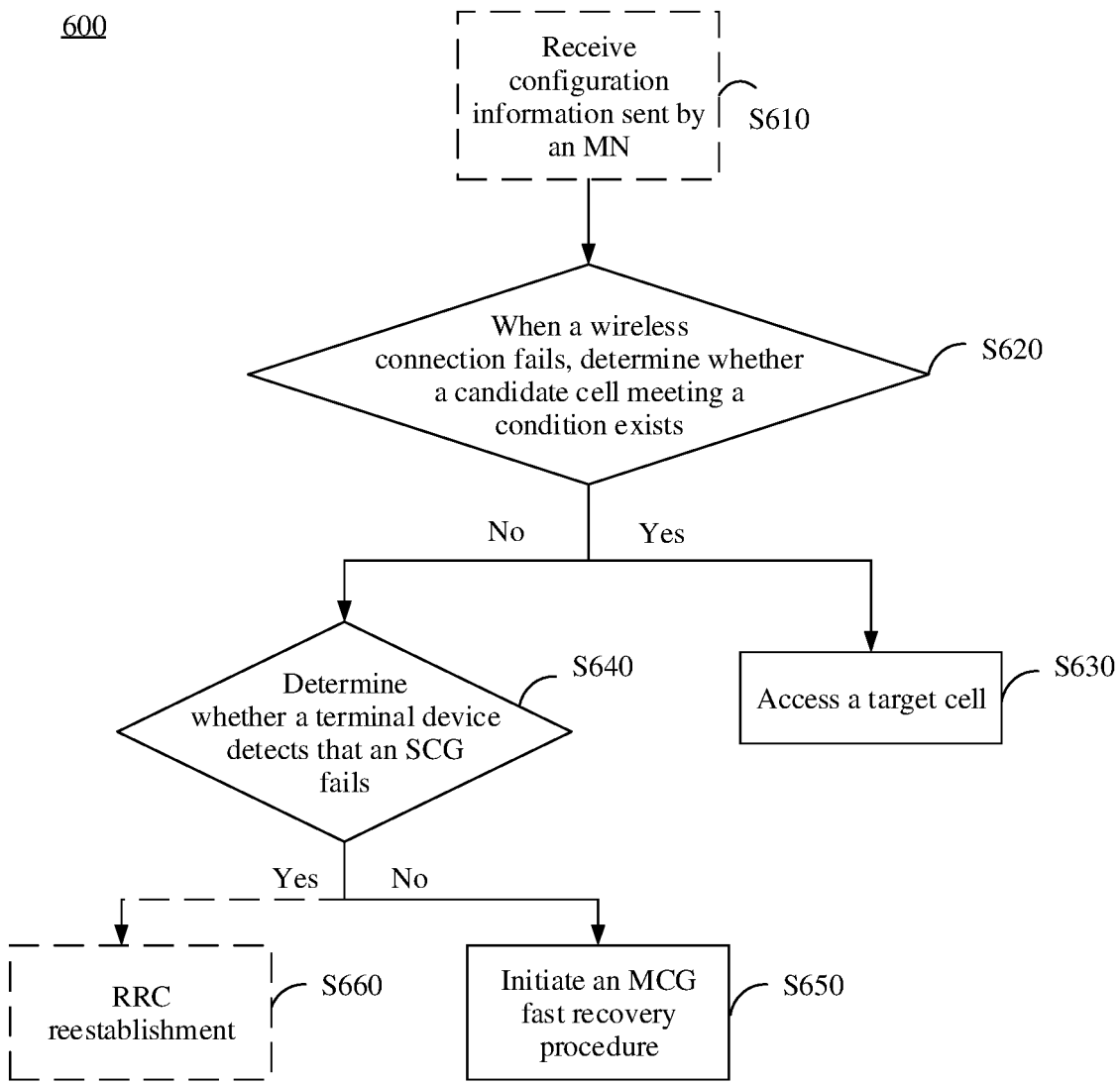
FIG. 6 is a schematic diagram of a communication method according to this application.

FIG. 6 shows a communication method 600. The following describes steps of the method 600 shown in FIG. 6.

S610: A terminal device receives configuration information sent by an MN. This step is the same as S410. For details, refer to S410.

S620: When the terminal device detects that a wireless connection fails, the terminal device determines whether a candidate cell meeting a sixth condition exists. The terminal device performs S630 if the candidate cell meeting the sixth condition exists. The terminal device performs S640 if the candidate cell meeting the sixth condition does not exist, that is, there is no candidate cell whose signal quality meets the sixth condition.

For example, the sixth condition may be that signal quality of the cell is greater than a specific threshold.

S630: The terminal device accesses a target cell. It should be understood that the target cell herein is the candidate cell meeting the sixth condition.

That the terminal device accesses the target cell is similar to that the terminal device accesses the target cell #1 in S430. Details are not described herein again.

S640 to S660: Same as S440 to S460. Details are not described herein again.

According to the method, when detecting that the wireless connection fails, if a candidate cell meeting a specific condition exists, the terminal device accesses the candidate cell, or if the candidate cell meeting the condition does not exist, the terminal device sends an MCG failure message to trigger an MCG fast recovery procedure. According to the method, RRC reestablishment in the conventional technology can be avoided, so that interruption to communication of the terminal device and a packet loss can be avoided.

Optionally, before S630, the MN may send fifth indication information to the terminal device, to indicate the terminal device to perform S630 if the terminal device determines, when detecting that the wireless connection fails, that the candidate cell meeting the sixth condition exists.

Optionally, before the terminal device sends an SCG failure message, the method may further include: The MN sends sixth indication information to the terminal device, where the sixth indication information is used to indicate the terminal device to send an MCG failure message to the MN via an SN when the candidate cell meeting the sixth condition does not exist.

Figure 7:
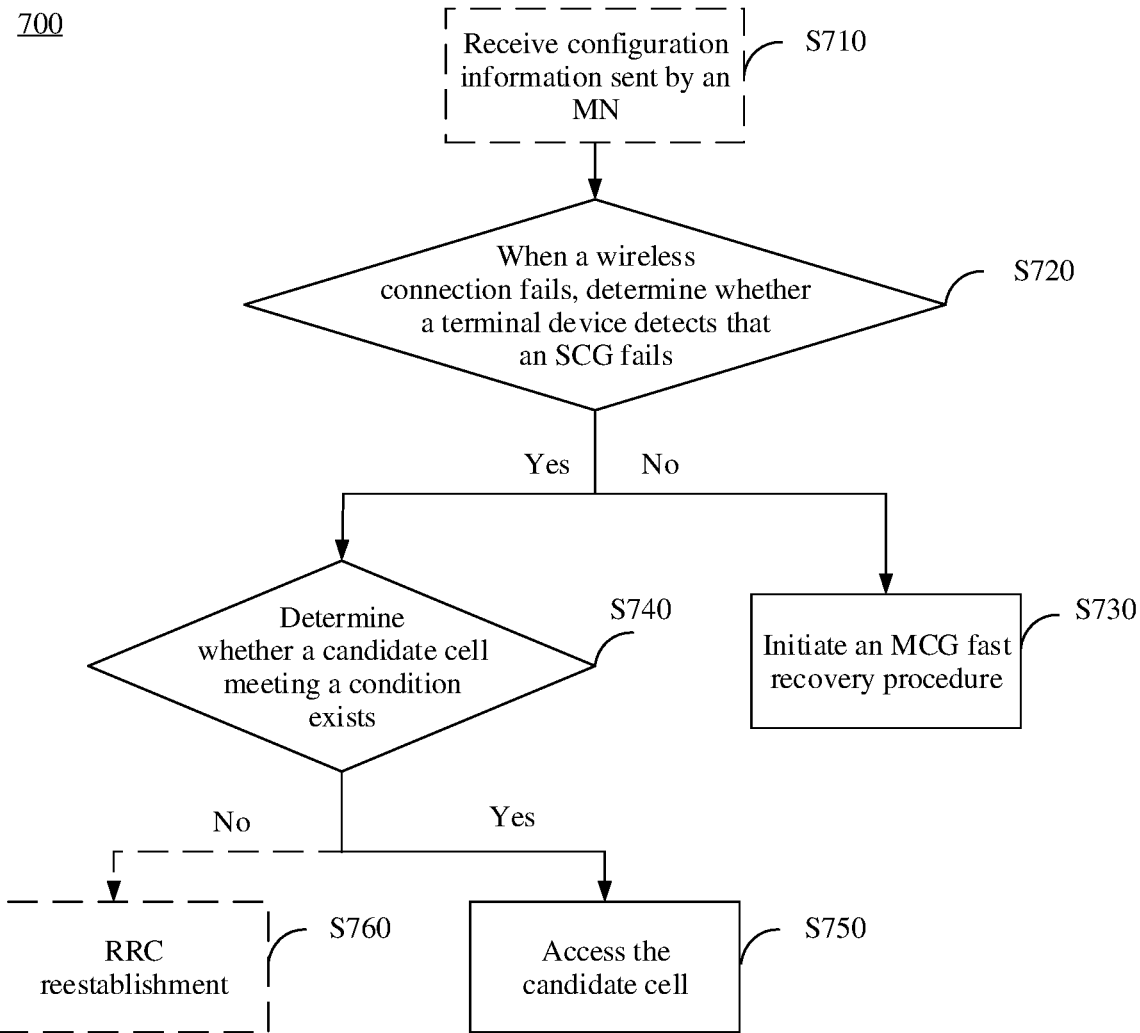
FIG. 7 is a schematic flowchart of a communication method according to this application.

FIG. 7 shows a communication method 700. The following describes steps of the method 700 shown in FIG. 7.

S710 to S730: Same as S510 to S530.

S740: The terminal device determines whether a candidate cell meeting a seventh condition exists.

The terminal device performs S750 if the candidate cell meeting the seventh condition exists, or the terminal device performs S760 if the candidate cell meeting the seventh condition does not exist.

For example, the seventh condition may be the signal quality of the cell is greater than a specific threshold.

The terminal device may determine signal quality of a previously configured candidate cell. If there is a candidate cell whose signal quality is greater than the threshold, the terminal device performs S750, or if there is no candidate cell whose signal quality is greater than the threshold, the terminal device performs S760.

S750: The terminal device accesses a target cell, where the target cell herein is the candidate cell meeting the seventh condition.

This step is similar to S550. For details, refer to S550.

S760: The terminal device performs RRC reestablishment. This step is the same as S560.

According to the method, when the terminal device detects that the wireless connection fails, if the terminal device does not detect that the SCG fails, the terminal device sends the MCG failure message to the MN via the SN, to trigger the MN to recover the wireless connection in an RRC reconfiguration procedure or a cell handover procedure, so as to avoid RRC reestablishment in the conventional technology. In addition, if the terminal device detects that the SCG fails, the terminal device may access, when a candidate cell meeting a specific condition exists, the candidate cell meeting the condition, to further avoid an RRC reestablishment procedure in the conventional technology. According to the foregoing method, the RRC reestablishment procedure is avoided, so that communication interruption and a packet loss can be avoided, to improve user experience.

This application further provides a communication method. The method includes: An MN sends indication information #1 to a terminal device, where the indication information #1 is used to indicate the terminal device to perform cell selection when the terminal device detects that a wireless connection fails, and access a selected cell when the selected cell is a candidate cell.

For ease of description, a process in which the terminal device performs cell selection and accesses the selected cell when the selected cell is the candidate cell is referred to as a first procedure below.

Optionally, the indication information #1 may be used to directly indicate the terminal device to perform the first procedure when the terminal device detects that the wireless connection fails.

For example, the indication information #1 is sent by using CHO configuration information, or the indication information #1 is CHO configuration information.

Further, the indication information #1 is CHO configuration information last received by the terminal device.

When detecting that the wireless connection fails, the terminal device recovers the wireless connection based on the last received CHO configuration information instead of previously received CHO configuration information. For example, the previously received CHO configuration information may be used to configure the terminal device to initiate an MCG fast recovery procedure to recover wireless connection when the terminal device detects that the wireless connection fails.

Optionally, the indication information #1 may further include a condition, and the indication information #1 may be used to indicate the terminal device to perform the first procedure when the terminal device detects that the wireless connection fails and the condition is met.

Optionally, the condition may be that a cell whose signal quality is greater than a first threshold exists in the candidate cell, or the condition may be that signal quality of an SN is less than or equal to a second threshold.

According to this solution, a plurality of mechanisms may be simultaneously configured for the terminal device to recover the wireless connection. When the wireless connection fails, the terminal device may simultaneously perform a plurality of mechanisms for recovering the wireless connection, and consequently another problem may be caused, or the terminal device does not perform any mechanism for recovering the wireless connection, and consequently the wireless connection cannot be recovered. According to the solution of this application, the MN may indicate the terminal device to perform cell selection when the wireless connection fails, and access the selected cell when the selected cell is the candidate cell, so that the terminal device can perform a corresponding procedure according to an indication of the MN to recover the wireless connection, so as to avoid the foregoing problem in the conventional technology. In addition, the MN may indicate, to the terminal device based on an actual status of the MN, a mechanism for recovering the wireless connection, so that flexibility can be improved.

This application further provides another communication method. The method includes: An MN sends indication information #2 to a terminal device, where the indication information #2 is used to indicate the terminal device to send an MCG failure message to the MN via an SN if the terminal device does not detect, when detecting that a wireless connection fails, that an SCG fails.

For ease of description, a process in which the terminal device sends the MCG failure message to the MN via the SN if the terminal device does not detect that the SCG fails is referred to as a second procedure below.

Optionally, the indication information #2 may be used to directly indicate the terminal device to perform the second procedure when the terminal device detects that the wireless connection fails.

For example, the indication information #2 is sent by using CHO configuration information, or the indication information #2 is CHO configuration information.

Further, the indication information #2 is CHO configuration information last received by the terminal device.

When detecting that the wireless connection fails, the terminal device recovers the wireless connection based on the last received CHO configuration information instead of previously received CHO configuration information. For example, the previously received CHO configuration information may be used to configure the terminal device to perform cell selection when the terminal device detects that the wireless connection fails, and access a selected cell when the selected cell is a candidate cell.

Optionally, the indication information #2 may further include a condition, and the indication information #2 may be used to indicate the terminal device to perform the second procedure when the terminal device detects that the wireless connection fails and the condition is met.

The condition may be, for example, that signal quality of the SN is greater than a fourth threshold.

According to this solution, a plurality of mechanisms may be simultaneously configured for the terminal device to recover the wireless connection. When the wireless connection fails, the terminal device may simultaneously perform a plurality of mechanisms for recovering the wireless connection, and consequently another problem may be caused, or the terminal device does not perform any mechanism for recovering the wireless connection, and consequently the wireless connection cannot be recovered. According to the solution of this application, the MN may indicate the terminal device to perform cell selection when the wireless connection fails, and access the selected cell when the selected cell is the candidate cell, so that the terminal device can perform a corresponding procedure according to an indication of the MN to recover the wireless connection, so as to avoid the foregoing problem in the conventional technology. In addition, the MN may indicate, to the terminal device based on an actual status of the MN, a mechanism for recovering the wireless connection, so that flexibility can be improved.

It should be noted that a protocol may further specify that when a plurality of mechanisms are simultaneously configured for the terminal device to recover the wireless connection, the terminal device performs only one of the mechanisms. For example, when the terminal device detects that the wireless connection fails, the terminal device performs the following procedure: The terminal device performs cell selection, and accesses the selected cell when the selected cell is the candidate cell, or the terminal device performs RRC reestablishment when the selected cell is not the candidate cell. Alternatively, the terminal device performs the following procedure: The terminal device detects whether the SCG fails, and if the SCG fails, the terminal device performs RRC reestablishment, or if the SCG does not fail, the terminal device sends an SCG failure message to the MN via the SN, to initiate an MCG fast recovery procedure.

Conditional addition, change, or modification of an SN is proposed in the conventional technology, that is, an MN or the SN may configure the addition, the change, or the modification of the SN by using a CHO mechanism. The MN or the SN sends CHO configuration information to the terminal device when quality of a source link is good. The CHO configuration information may include a CHO trigger condition for adding, changing, or modifying the SN and information about one or more candidate cells of the SN. The information about the candidate cell may include a cell global identifier (CGI) of the candidate cell, or a physical cell identifier (PCI) of the candidate cell and frequency information corresponding to the candidate cell. After receiving the CHO configuration information for adding, changing, or modifying the SN, the terminal device determines, based on the CHO configuration information, whether the candidate cell meets the CHO trigger condition, and uses a candidate cell meeting the CHO trigger condition as a target cell. Then, the terminal device performs a random access procedure with the determined target cell. When random access is successfully completed, the terminal device sends an RRC message (for example, an RRC reconfiguration complete message) to the target cell, to notify the target cell that conditional handover is completed. In the CHO procedure, the terminal device is handed over to a cell corresponding to the SN without a need to send a measurement report of signal quality of the SN or wait for a handover command, so that a success rate of accessing the candidate cell can be improved.

In addition, in the conventional technology, in an MR-DC scenario, after the terminal device detects that an SCG fails, the terminal device suspends transmission of a radio bearer in the SCG, and the terminal device may send an SCG failure message to the MN without triggering RRC reestablishment. After the MN receives the SCG failure message, the MN may perform related processing, for example, the MN may change the SN, release the SN, or modify the SN, and then the MN sends a response message to the terminal device. In the response message, the previous radio bearer in the SCG is migrated to another SN, migrated to the MN, or modified. The terminal device re-enables, only after receiving the response message from the MN, transmission of services corresponding to the previous bearer in the SCG (by using radio configuration information in the response message). Therefore, transmission of these services is interrupted.

This application provides a communication method. In the method, when an SN fails, a terminal device may first determine signal quality of a candidate cell. If the signal quality is good, the terminal device may be directly handed over to the candidate cell. After being handed over to the candidate cell, the terminal device may directly perform data communication in the candidate cell (by using previous radio configuration information corresponding to the candidate cell), and does not need to first suspend transmission of a bearer in the SCG, to reduce service interruption time. The following describes the solution with reference to FIG. 8.

Figure 8:
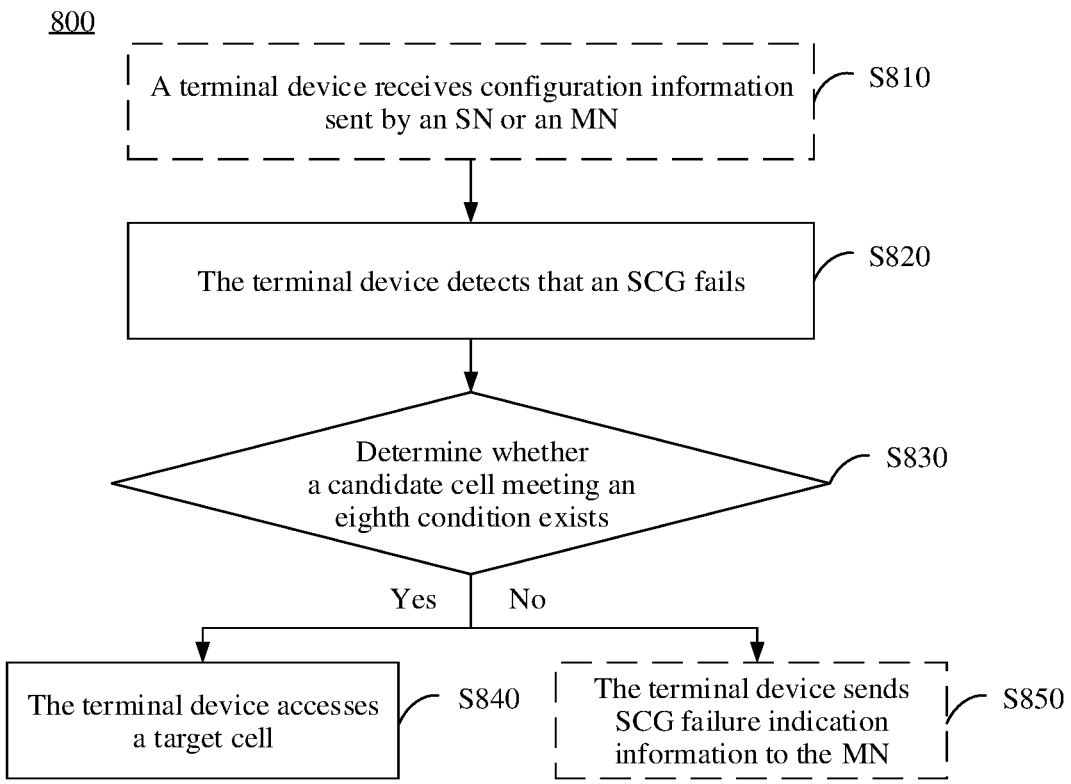
FIG. 8 is a schematic flowchart of a communication method according to this application.

FIG. 8 is a schematic flowchart of a communication method according to this application. The following describes steps.

S810: An MN or an SN sends configuration information to a terminal device.

The configuration information may include information about one or more candidate cells of the SN. The information about the candidate cell may include, for example, a cell global identifier (CGI) of the candidate cell, or a physical cell identifier (PCI) of the candidate cell and frequency information corresponding to the candidate cell.

For example, the configuration information may be CHO configuration information for adding, changing, or modifying the SN.

S820: The terminal device detects that an SCG fails.

A mechanism for detecting that the SCG fails is the same as that in S440.

S830: The terminal device determines whether a candidate cell meeting an eighth condition exists.

The candidate cell is a candidate cell of the SN in the CHO configuration information that is for adding, changing, or modifying the SN and that is sent by the MN or the SN to the terminal device.

The terminal device determines whether the candidate cell meeting the eighth condition exists. The terminal device performs S840 if the candidate cell meeting the eighth condition exists. The terminal device performs S850 if the candidate cell meeting the eighth condition does not exist, that is, there is no candidate cell whose signal quality meets the eighth condition.

For example, the eighth condition may be that signal quality of the cell is greater than a specific threshold.

S840: The terminal device accesses a target cell. It should be understood that the target cell herein is the candidate cell meeting the eighth condition.

For example, that the terminal device accesses the target cell means that the terminal device sends an RRC reconfiguration complete message to the target cell. Optionally, before sending the RRC reconfiguration complete message, the terminal device needs to first perform a random access procedure.

Optionally, if accessing the target cell by the terminal device fails, the terminal device may perform S850 and subsequent corresponding steps.

Optionally, when an SN base station to which the target cell belongs is different from a previous SN base station of the terminal device, the base station to which the target cell belongs sends a message to the MN, to notify the MN that the terminal device has accessed the SN base station to which the target cell belongs.

Optionally, when the terminal device successfully accesses the target cell, if the terminal device detects that a wireless connection fails (for details, refer to descriptions that the wireless connection fails in step S420), the terminal device may send an MCG failure message to the MN via the SN to which the target cell belongs. For specific steps, refer to S450a to S450e.

S850: The terminal device sends SCG failure indication information to the MN.

After the MN receives the SCG failure indication information, the MN may perform related processing, for example, change the SN or release the SN.

Optionally, before S840, the method may further include: The MN sends indication information to the terminal device, where the indication information is used to indicate the terminal device to determine, when the terminal device detects that the SCG fails, whether the candidate cell meeting the eighth condition exists, and access, if the candidate cell meeting the eighth condition exists, the candidate cell meeting the eighth condition. For example, the eighth condition may be carried in the indication information. This is not limited in this application. For example, the eighth condition may alternatively be carried in the CHO configuration information.

The indication information such as first indication information, second indication information, and third indication information in this application may be an RRC message. However, this is not limited in this application.

The foregoing describes, in detail with reference to FIG. 4 to FIG. 8, the methods provided in embodiments of this application. The following describes, in detail with reference to FIG. 9 to FIG. 11, apparatuses provided in embodiments of this application.

Figure 9:
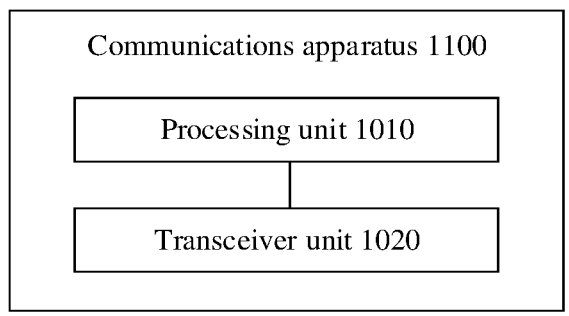
FIG. 9 is a schematic block diagram of a communications apparatus according to this application.

FIG. 9 is a schematic block diagram of a communications apparatus according to an embodiment of this application. As shown in FIG. 9, the communications apparatus 1000 may include a processing unit 1010 and a transceiver unit 1020.

In a possible design, the communications apparatus 1000 may correspond to the terminal device in the foregoing method embodiments. The communications apparatus 1000 may be configured to perform an operation performed by the terminal device in any one of the foregoing method embodiments.

In one manner, when detecting that a wireless connection fails, the processing unit 1010 performs cell selection, and if a target cell is a candidate cell pre-configured by a master node MN, the processing unit 1010 is further configured to access the target cell, or if a target cell is not a candidate cell, and the processing unit 1010 does not detect that a secondary cell group SCG fails, the transceiver unit 1020 is configured to send a master cell group MCG failure message to an MN via a secondary node SN, where the target cell is a cell selected by the processing unit 1010 during cell selection.

Optionally, if the target cell is not the candidate cell, and the transceiver unit 1020 detects that the SCG fails, the transceiver unit 1020 is further configured to send a radio resource control RRC reestablishment request message to the target cell.

Optionally, the transceiver unit 1020 is further configured to receive first indication information sent by the MN, where the first indication information is used to indicate the processing unit 1010 to preferentially perform cell selection when the processing unit 1010 detects that a wireless connection fails, and access a selected cell when the selected cell is the candidate cell, or the first indication information includes a first condition, and the first condition is used to indicate the processing unit 1010 to preferentially perform cell selection when the processing unit 1010 detects that the wireless connection fails and the first condition is met, and access a selected cell when the selected cell is the candidate cell, or the first indication information includes a first condition, and the first indication information is further used to indicate the processing unit 1010 to preferentially perform cell selection when the processing unit 1010 detects that the wireless connection fails and the first condition is met, and access a selected cell when the selected cell is the candidate cell.

Optionally, the first condition includes one or more of the following: a cell whose signal quality is greater than a first threshold exists in the candidate cell, or signal quality of the SN is less than or equal to a second threshold.

Optionally, the transceiver unit 1020 is further configured to receive second indication information sent by the MN, where the second indication information is used to indicate the transceiver unit 1020 to send the MCG failure message to the MN via the SN when the cell selected by the processing unit 1010 is not the candidate cell, or the second indication information includes a second condition, and the second condition is used to indicate the transceiver unit 1020 to send the MCG failure message to the MN via the SN when the cell selected by the processing unit 1010 is not the candidate cell and the second condition is met, or the second indication information includes a second condition, and the second indication information is further used to indicate the transceiver unit 1020 to send the MCG failure message to the MN via the SN when the cell selected by the processing unit 1010 is not the candidate cell and the second condition is met.

Optionally, the second condition includes one or more of the following: signal quality of the selected cell is less than a third threshold, or the signal quality of the SN is greater than a fourth threshold.

Optionally, if accessing the target cell by the communications apparatus 1000 fails, and the processing unit 1010 does not detect that the SCG fails, the transceiver unit 1020 is further configured to send the MCG failure message to the MN via the SN.

Optionally, that the processing unit 1010 detects that the wireless connection fails includes one or more of the following cases: a radio link failure occurs in an CG, a handover failure occurs in an MCG, a radio resource control RRC reconfiguration failure occurs, or integrity check performed by the processing unit 1010 on a data packet received over a signaling radio bearer SRB 1 or an SRB 2 fails.

In another manner, when the processing unit 1010 detects that a wireless connection fails, but does not detect that a secondary cell group SCG fails, the transceiver unit 1020 sends a master cell group MCG failure message to a master node MN via a secondary node SN. If the processing unit 1010 detects that the SCG fails, the processing unit 1010 performs cell selection. If a target cell is a candidate cell pre-configured by the MN, the processing unit 1010 accesses the target cell, where the target cell is a cell selected by the processing unit 1010 during cell selection.

Optionally, if the target cell is not the candidate cell, the transceiver unit 1020 is further configured to send a radio resource control RRC reestablishment request message to the target cell.

Optionally, the transceiver unit 1020 is further configured to receive third indication information sent by the MN, where the third indication information is used to indicate the transceiver unit 1020 to preferentially send the MCG failure message to the MN via the SN when the processing unit 1010 detects that the wireless connection fails, or the third indication information includes a third condition, and the third condition is used to indicate the transceiver unit 1020 to preferentially send the MCG failure message to the MN via the SN when the processing unit 1010 detects that the wireless connection fails and the third condition is met, or the third indication information includes a third condition, and the third indication information is used to indicate the transceiver unit 1020 to preferentially send the MCG failure message to the MN via the SN when the processing unit 1010 detects that the wireless connection fails and the third condition is met.

Optionally, the third condition includes: signal quality of the SN is greater than or equal to a second threshold.

Optionally, the transceiver unit 1020 is further configured to receive fourth indication information sent by the MN, where the fourth indication information is used to indicate that the processing unit 1010 may access the candidate cell when the transceiver unit 1020 cannot send the MCG failure message to the MN via the SN or does not receive a response to the MCG failure message from the MN, or the fourth indication information includes a fourth condition, and the fourth condition indicates that the processing unit 1010 may access the candidate cell when the transceiver unit 1020 cannot send the MCG failure message to the MN via the SN or does not receive a response to the MCG failure message from the MN, and when the fourth condition is met, or the fourth indication information includes a fourth condition, and the fourth indication information indicates that the processing unit 1010 may access the candidate cell when the transceiver unit 1020 cannot send the MCG failure message to the MN via the secondary node SN or does not receive a response to the MCG failure message from the MN, and when the fourth condition is met.

Optionally, the fourth condition includes: a cell whose signal quality is greater than or equal to a fifth threshold exists in the candidate cell.

Optionally, that the processing unit 1010 detects that the wireless connection fails includes one or more of the following cases: a radio link failure occurs in an MCG, a handover failure occurs in an MCG, a radio resource control RRC reconfiguration failure occurs, or integrity check performed by the processing unit 1010 on a data packet received over a signaling radio bearer SRB 1 or an SRB 2 fails.

It should be understood that the communications apparatus 1000 may correspond to the terminal device in the foregoing method embodiments. The communications apparatus 1000 may include units configured to perform the method performed by the terminal device in the foregoing method embodiments. In addition, the units in the communications apparatus 1000 and the foregoing other operations and/or functions are intended to implement corresponding procedures in the foregoing method embodiments. It should be understood that, a specific process in which each unit performs a corresponding step in the foregoing method embodiments has been described in detail in the foregoing method embodiments. For brevity, details are not described herein again.

In another possible design, the communications apparatus 1000 may correspond to the MN in the foregoing method embodiments. The communications apparatus 1000 may be configured to perform an operation performed by the MN in any one of the foregoing method embodiments.

In one manner, the processing unit 1010 is configured to generate first indication information, and the transceiver unit 1020 is configured to send the first indication information to a terminal device, where the first indication information is used to indicate the terminal device to preferentially perform cell selection when the terminal device detects that a wireless connection fails, and access a selected cell when the selected cell is a candidate cell, or the first indication information includes a first condition, and the first condition is used to indicate the terminal device to preferentially perform cell selection when the terminal device detects that a wireless connection fails and the first condition is met, and access a selected cell when the selected cell is a candidate cell, or the first indication information includes a first condition, and the first indication information is further used to indicate the terminal device to preferentially perform cell selection when the terminal device detects that a wireless connection fails and the first condition is met, and access a selected cell when the selected cell is a candidate cell, and the candidate cell is a cell pre-configured by the communications apparatus 1000 for the terminal device.

Optionally, the first condition includes one or more of the following: a cell whose signal quality is greater than a first threshold exists in the candidate cell, or signal quality of a secondary node SN is less than or equal to a second threshold.

Optionally, the processing unit 1010 is further configured to generate second indication information, and the transceiver unit 1020 is further configured to send the second indication information to the terminal device, where the second indication information is used to indicate the terminal device to send a master cell group MCG failure message to the communications apparatus 1000 via the secondary node SN when the selected cell is not the candidate cell, or the second indication information includes a second condition, and the second condition is used to indicate the terminal device to send an MCG failure message to the communications apparatus 1000 via the SN when the selected cell is not the candidate cell and the second condition is met, or the second indication information includes a second condition, and the second indication information is used to indicate the terminal device to send an MCG failure message to the communications apparatus 1000 via the SN when the selected cell is not the candidate cell and the second condition is met.

Optionally, the second condition includes one or more of the following: signal quality of the selected cell is less than a third threshold, or the signal quality of the SN is greater than or equal to a fourth threshold.

In another manner, the processing unit 1010 is configured to generate third indication information, and the transceiver unit 1020 is configured to send the third indication information to the terminal device, where the third indication information is used to indicate the terminal device to preferentially send a master cell group MCG failure message to the communications apparatus 1000 via a secondary node SN when the terminal device detects that a wireless connection fails, or the third indication information includes a third condition, and the third condition is used to indicate the terminal device to preferentially send an MCG failure message to the communications apparatus 1000 via an SN when the terminal device detects that a wireless connection fails and the third condition is met, or the third indication information includes a third condition, and the third indication information is used to indicate the terminal device to preferentially send an MCG failure message to the communications apparatus 1000 via an SN when the terminal device detects that a wireless connection fails and the third condition is met.

Optionally, the third condition includes: signal quality of the SN is greater than or equal to a second threshold.

The processing unit 1010 is further configured to generate fourth indication information, and the transceiver unit 1020 is further configured to send the fourth indication information to the terminal device, where the fourth indication information is used to indicate the terminal device to access a candidate cell when the terminal device cannot send the MCG failure message to the communications apparatus 1000 via the SN or does not receive a response to the MCG failure message from the communications apparatus 1000, or the fourth indication information includes a fourth condition, and the fourth condition is used to indicate the terminal device to access a candidate cell when the terminal device cannot send the MCG failure message to the communications apparatus 1000 via the SN or does not receive a response to the MCG failure message from the communications apparatus 1000, and when the fourth condition is met, or the fourth indication information includes a fourth condition, and the fourth indication information is used to indicate the terminal device to access a candidate cell when the terminal device cannot send the MCG failure message to the communications apparatus 1000 via the secondary node SN or does not receive a response to the MCG failure message from the communications apparatus 1000, and when the fourth condition is met, and the candidate cell is a cell pre-configured by the communications apparatus 1000 for the terminal device.

Optionally, the fourth condition includes: a cell whose signal quality is greater than or equal to a fifth threshold exists in the candidate cell.

It should be understood that the communications apparatus 1000 may correspond to the MN in the foregoing method embodiments, and the communications apparatus 1000 may include units configured to perform the method performed by the MN in the foregoing method embodiments. In addition, the units in the communications apparatus 1000 and the foregoing other operations and/or functions are intended to implement corresponding procedures in the foregoing method embodiments. It should be understood that, a specific process in which each unit performs a corresponding step in the foregoing method embodiments has been described in detail in the foregoing method embodiments. For brevity, details are not described herein again.

It should be further understood that, when the communications apparatus 1000 is a chip configured in a network device, the transceiver unit 1020 in the communications apparatus moo may be an input/output interface.

Figure 10:
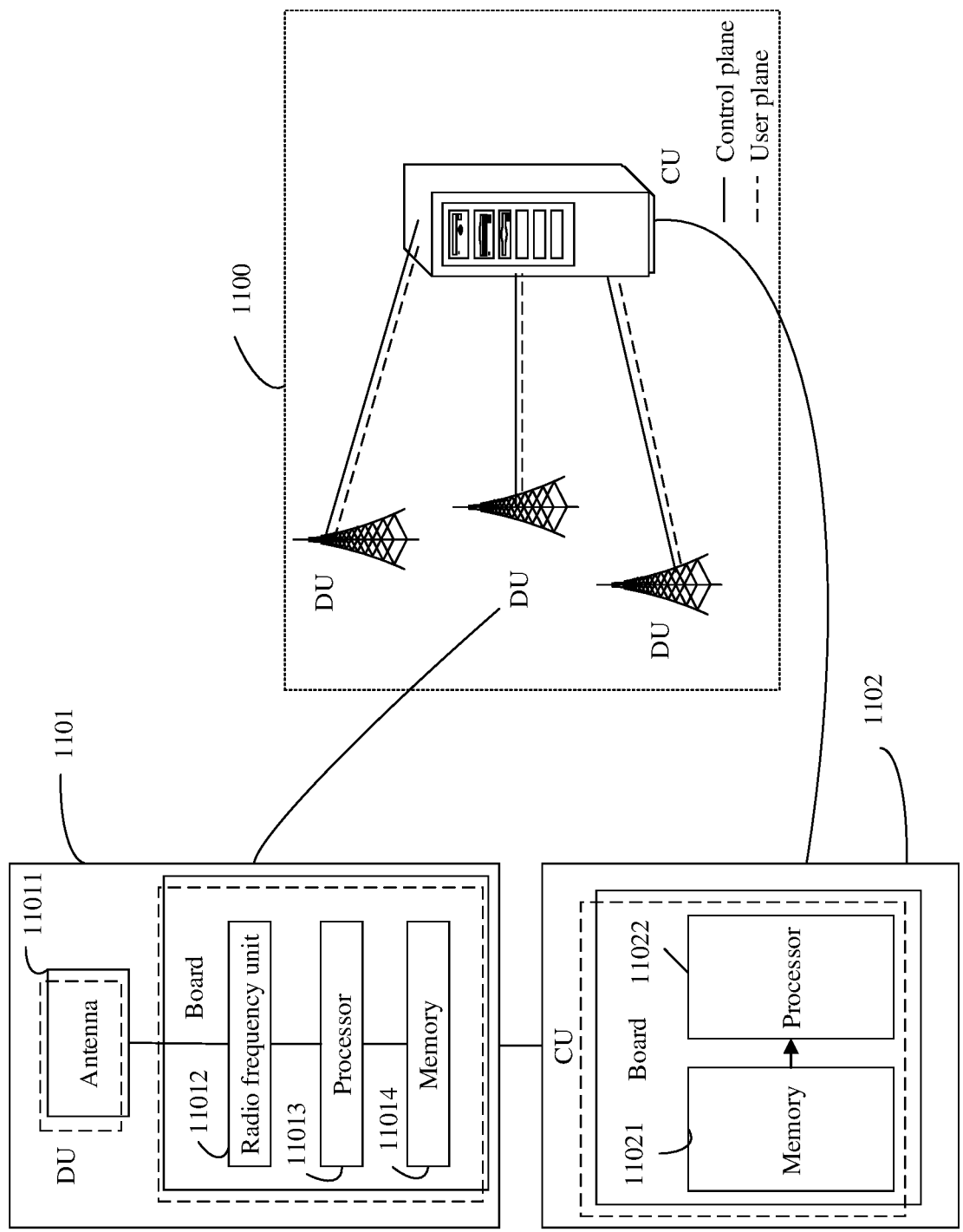
FIG. 10 is a schematic diagram of a structure of a network device according to this application.

FIG. 10 is a schematic diagram of a structure of a network device according to an embodiment of this application, for example, may be a schematic diagram of a structure of a base station. As shown in FIG. 10, the network device may implement functions of the MN in the foregoing method embodiments. The network device 1100 may include one or more DUs 1101 and one or more CUs 1102. The CU 1102 may communicate with a next generation core (NG core, NC). The DU 1101 may include at least one antenna non, at least one radio frequency unit 11012, at least one processor 11013, and at least one memory 11014. The DU 1101 is mainly configured to: receive and send a radio frequency signal, perform conversion between a radio frequency signal and a baseband signal, and perform partial baseband processing. The CU 1102 may include at least one processor 11022 and at least one memory 11021. The CU 1102 and the DU 1101 may communicate with each other through an interface. A control plane interface may be Fs-C, for example, F1-C, and a user plane interface may be Fs-U, for example, F1-U.

The CU 1102 is mainly configured to: perform baseband processing, control the base station, and the like. The DU 1101 and the CU 1102 may be physically disposed together, or may be physically disposed separately, that is, a distributed base station. The CU 1102 is a control center of the base station, may also be referred to as a processing unit, and is mainly configured to complete a baseband processing function. For example, the CU 1102 may be configured to control the base station to perform an operation procedure related to the MN in the foregoing method embodiments.

Specifically, baseband processing on the CU and the DU may be divided based on protocol layers of a wireless network. For example, functions of a packet data convergence protocol (PDCP) layer and a protocol layer above the PDCP layer are set in the CU. Functions of one or more of protocol layers such as a radio link control (RLC) layer and a medium access control (MAC) layer below the PDCP layer are set in the DU. For another example, the CU implements functions of a radio resource control (RRC) layer and a packet data convergence protocol (PDCP) layer. The DU implements functions of a radio link control (RLC) layer, a MAC layer, and a physical (PHY) layer.

In addition, optionally, the network device 1100 may include one or more radio frequency units (RUs), one or more DUs, and one or more CUs. The DU may include the at least one processor 11013 and the at least one memory 11014, the RU may include the at least one antenna non and the at least one radio frequency unit 11012, and the CU may include the at least one processor 11022 and the at least one memory 11021.

In an example, the CU 1102 may include one or more boards, and a plurality of boards may jointly support a radio access network (for example, a 5G network) of a single access standard, or may separately support radio access networks (such as an LTE network, a 5G network, or another network) of different access standards. The memory 11021 and the processor 11022 may serve one or more boards. In other words, the memory and the processor may be separately disposed on each board. Alternatively, the plurality of boards may share a same memory and processor. In addition, a necessary circuit may be further disposed on each board. The DU 1101 may include one or more boards, and a plurality of boards may jointly support a radio access network (for example, a 5G network) of a single access standard, or may separately support radio access networks (such as an LTE network, a 5G network, or another network) of different access standards. The memory 11014 and the processor 11013 may serve one or more boards. In other words, the memory and the processor may be separately disposed on each board. Alternatively, the plurality of boards may share a same memory and processor. In addition, a necessary circuit may be further disposed on each board.

Figure 11:
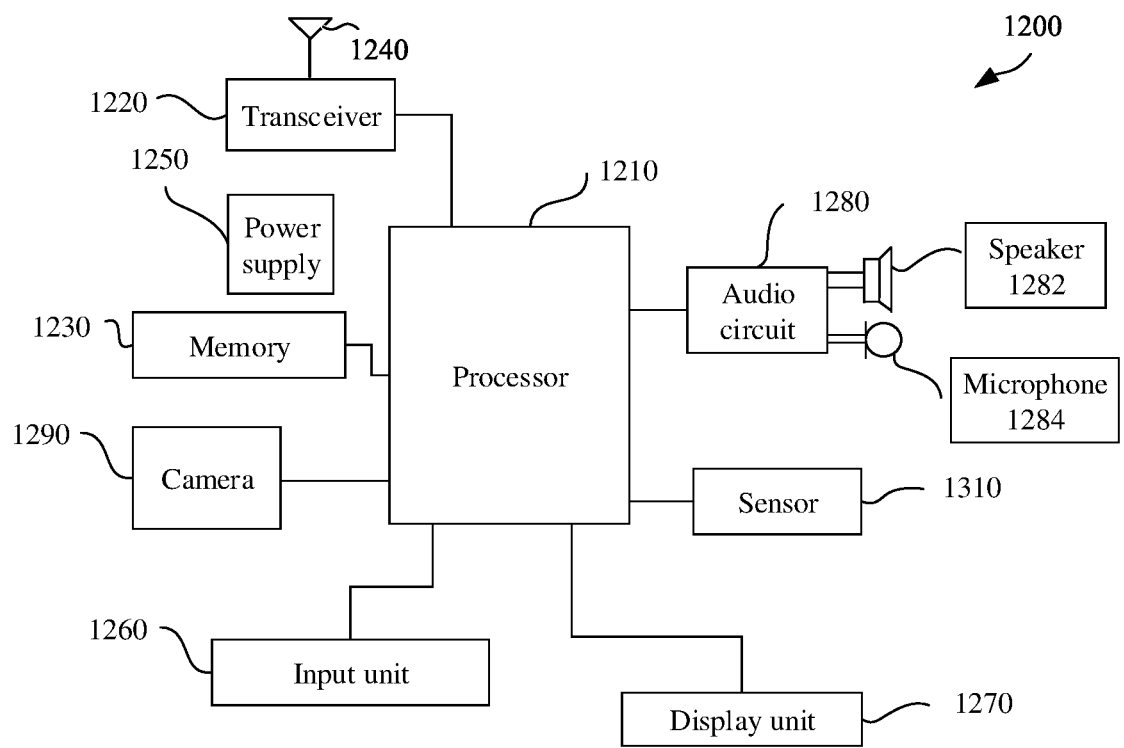
FIG. 11 is a schematic diagram of a structure of a terminal device according to this application.

FIG. 11 is a schematic diagram of a structure of a terminal device 1200 according to an embodiment of this application. The terminal device 1200 may perform functions of the terminal device in the foregoing method embodiments. As shown in FIG. 11, the terminal device 1200 includes a processor 1210 and a transceiver 1220. Optionally, the terminal device 1200 further includes a memory 1230. The processor 1210, the transceiver 1220, and the memory 1230 may communicate with each other through an internal connection path, to transfer a control signal and/or a data signal. The memory 1230 is configured to store a computer program. The processor 1210 is configured to: invoke the computer program from the memory 1230 and run the computer program, to control the transceiver 1220 to receive and send a signal. Optionally, the terminal device 1200 may further include an antenna 1240, configured to send, through a radio signal, uplink data or uplink control signaling that is output by the transceiver 1220.

The processor 1210 and the memory 1230 may be integrated into one processing apparatus. The processor 1210 is configured to execute program code stored in the memory 1230 to implement the foregoing functions. In a specific implementation, the memory 1230 may alternatively be integrated into the processor 1210, or may be independent of the processor 1210. The processor 1210 may correspond to the processing unit in FIG. 9.

The transceiver 1220 may correspond to the transceiver unit in FIG. 9, and may also be referred to as a transceiver unit. The transceiver 1220 may include a receiver (or referred to as a receiver machine or a receiver circuit) and a transmitter (or referred to as a transmitter machine or a transmitter circuit). The receiver is configured to receive a signal, and the transmitter is configured to transmit a signal.

It should be understood that, the terminal device 1200 shown in FIG. 11 can implement processes related to the terminal device in the foregoing method embodiments. The operations and/or the functions of the modules in the terminal device 1200 are intended to implement corresponding procedures in the foregoing method embodiments. For details, refer to the descriptions in the foregoing method embodiments. To avoid repetition, detailed descriptions are properly omitted herein.

The processor 1210 may be configured to perform an action that is implemented inside the terminal device and that is described in the foregoing method embodiments, and the transceiver 1220 may be configured to perform an action of sending to the MN or receiving from the MN that is performed by the terminal device and that is described in the foregoing method embodiments. For details, refer to the descriptions in the foregoing method embodiments. The details are not described herein again.

Optionally, the terminal device 1200 may further include a power supply 1250, configured to supply power to components or circuits in the terminal device.

In addition, the terminal device 1200 may further include one or more of an input unit 1260, a display unit 1270, an audio circuit 1280, a camera 1290, a sensor 1310, and the like, to implement more functions of the terminal device. The audio circuit may further include one or more of a speaker 1282, a microphone 1284, and the like.

An embodiment of this application further provides a processing apparatus, including a processor and an interface. The processor is configured to perform the method in the foregoing method embodiments.

It should be understood that, the processing apparatus may be one or more chips. For example, the processing apparatus may be a field programmable gate array (FPGA), an application-specific integrated circuit (ASIC), a system on chip (SoC), a central processing unit (CPU), a network processor (NP), a digital signal processor (DSP), a micro controller unit (MCU), a programmable logic device (PLD), or another integrated chip.

In an implementation process, the steps in the foregoing methods can be implemented by using a hardware integrated logic circuit in the processor, or by using instructions in a form of software. The steps in the methods disclosed with reference to embodiments of this application may be directly performed and completed by a hardware processor, or may be performed and completed by using a combination of hardware and software modules in a processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with the hardware of the processor. To avoid repetition, details are not described herein again.

It should be understood that the processor in embodiments of this application may be an integrated circuit chip, and has a signal processing capability. In an implementation process, steps in the foregoing method embodiments can be implemented by using a hardware integrated logical circuit in the processor, or by using instructions in a form of software. The foregoing processor may be a general-purpose processor, a digital signal processor (DSP), an application-specific integrated circuit (ASIC), a field programmable gate array (FPGA) or another programmable logic device, a discrete gate or a transistor logic device, or a discrete hardware component.

It may be understood that the memory in embodiments of this application may be a volatile memory or a nonvolatile memory, or may include both a volatile memory and a nonvolatile memory. The nonvolatile memory may be the read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), and is used as an external cache. Through examples but not limitative descriptions, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that memories in the system and method described in this specification include but are not limited to the memories and memories of any other proper types.

This application further provides a computer-readable medium. The computer-readable medium stores a computer program. When the computer program is executed by a computer, functions of any one of the foregoing method embodiments are implemented.

This application further provides a computer program product. When the computer program product is executed by a computer, functions of any one of the foregoing method embodiments are implemented.

All or some of the foregoing embodiments may be implemented by using software, hardware, firmware, or any combination thereof. When software is used to implement embodiments, embodiments may be implemented completely or partially in a form of a computer program product. The computer program product includes one or more computer instructions. When the computer instructions are loaded and executed on the computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

It should be understood that "an embodiment" mentioned in the entire specification means that particular features, structures, or characteristics related to the embodiment are included in at least one embodiment of this application. Therefore, embodiments in the entire specification are not necessarily same embodiments. In addition, these particular features, structures, or characteristics may be combined in one or more embodiments in any proper manner. It should be understood that, in embodiments of this application, sequence numbers of the foregoing processes do not mean execution sequences. The execution sequences of the processes should be determined based on functions and internal logic of the processes, and should not constitute any limitation on implementation processes of embodiments of this application.

It should be understood that in this application, "greater than" may be replaced with "greater than or equal to", and "less than" may be replaced with "less than or equal to".

It should be further understood that, in this application, "when" and "if" mean that UE or a base station performs corresponding processing in an objective situation, and are not intended to limit time, and the UE or the base station is not necessarily required to have a determining action during implementation, and do not mean any other limitation.

In addition, the terms "system" and "network" are usually used interchangeably in this specification. The term "and/or" in this specification describes only an association relationship for associated objects and represents that three relationships may exist. For example, A and/or B may represent the following three cases: Only A exists, both A and B exist, and only B exists.

The term "at least one of . . . " in this specification represents all or any combination of the listed items. For example, "at least one of A, B, and C" may represent the following six cases: Only A exists, only B exists, only C exists, both A and B exist, both B and C exist, and A, B, and C all exist.

It should be understood that, in embodiments of this application, "B corresponding to A" indicates that B is associated with A, and B may be determined based on A. However, it should be further understood that determining B based on A does not mean that B is determined based on only A. B may alternatively be determined based on A and/or other information.

A person of ordinary skill in the art may be aware that, units and algorithm steps in the examples described with reference to embodiments disclosed in this specification can be implemented by electronic hardware or a combination of computer software and electronic hardware. Whether these functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief descriptions, for detailed working processes of the foregoing systems, apparatuses, and units, refer to corresponding processes in the foregoing method embodiments. Details are not described herein again.

In the several embodiments provided in this application, it should be understood that the disclosed system, apparatus, and method may be implemented in another manner. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or another form.

The units described as separate parts may or may not be physically separate, and parts displayed as units may or may not be physical units, and may be located at one location, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for indicating a computer device (which may be a personal computer, a server, a network device, or the like) to perform all or some of the steps in the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, performed by a terminal device or a chip of the terminal device, comprising:
   determining whether the terminal device detects a failure of a secondary cell group (SCG);
   sending a master cell group (MCG) failure message to a master node (MN) via a secondary node (SN) in response to detecting that a wireless connection fails, and further in response to determining that the terminal device has not detected the failure of the SCG;
   performing cell selection in response to determining that the terminal device has detected the failure of the SCG; and
   accessing a target cell in response to the target cell being a candidate cell pre-configured by the MN, wherein the target cell is a cell selected by the terminal device during the cell selection, wherein the SCG is a group of cells associated with the SN, and wherein the MCG is a group of cells associated with the MN.

2. The method according to claim 1, further comprising:
   sending, in response to the target cell not being the candidate cell, a radio resource control (RRC) reestablishment request message to the target cell.

3. The method according to claim 1, further comprising performing, before the sending the master cell group (MCG) failure message to the master node (MN):
   receiving third indication information from the MN;
   wherein at least one of:
      the third indication information indicates to the terminal device that a priority of sending the MCG failure message to the MN via the SN in response to the terminal device detecting that the wireless connection fails is higher than a priority of performing the cell selection; or
      the third indication information comprises a third condition, and wherein the third condition or the third indication information indicates to the terminal device that a priority of sending the MCG failure message to the MN via the SN in response to the terminal device detecting that the wireless connection fails and further in response to the third condition being met, is higher than a priority of performing the cell selection.

4. The method according to claim 3, wherein the third condition comprises a signal quality of the SN being greater than or equal to a second threshold.

5. The method according to claim 1, further comprising performing, before the accessing the target cell:
   receiving fourth indication information from the MN;
   wherein at least one of:
      the fourth indication information indicates to the terminal device to access the candidate cell in response to the terminal device not being able to send the MCG failure message to the MN via the SN or in response to not receiving a response to the MCG failure message from the MN; or
      the fourth indication information comprises a fourth condition, and the fourth condition or the fourth indication information indicates to the terminal device to access the candidate cell in response to the terminal device not being able to send the MCG failure message to the MN via the SN or in response to not receiving a response to the MCG failure message from the MN, and further in response to the fourth condition being met.

6. The method according to claim 5, wherein the fourth condition comprises a cell whose signal quality being greater than or equal to a fifth threshold of the candidate cell.

7. The method according to claim 1, wherein the detecting that the wireless connection fails comprises detecting one or more of:
   a radio link failure occurring in the MCG;
   a handover failure occurring in the MCG;
   a radio resource control (RRC) reconfiguration failure occurring; or
   integrity check performed on a data packet received over one or more of a signaling radio bearer (SRB) 1 or an SRB 2 failing.

8. An apparatus, which is a master node (MN), or a chip for the MN, comprising:
   a processor; and
   a non-transitory memory storing a program for execution by the processor, the program including instructions for:
      generating fourth indication information; and
      sending the fourth indication information to a terminal device;
   wherein at least one of:
      the fourth indication information indicates to the terminal device to access a candidate cell in response to at least one of: the terminal device being unable to send a master cell group (MCG) failure message to the MN via a secondary node (SN), or the terminal device not receiving a response to the MCG failure message from the MN; or
      the fourth indication information comprises a fourth condition, and wherein the fourth condition or the fourth indication information indicates to the terminal device to access a candidate cell in response to at least one of: the terminal device being unable to send a master cell group (MCG) failure message to the MN via a secondary node (SN), or the terminal device not receiving response to the MCG failure message from the MN, and further in response to the fourth condition being met; and wherein the candidate cell is a cell pre-configured by the MN for the terminal device.

9. The apparatus according to claim 8, wherein the program further includes instructions for:
generating third indication information; and
sending the third indication information to the terminal device;
wherein the third indication information at least one of:
indicates to the terminal device that a priority of sending the MCG failure message to the MN via the SN in response to the terminal device detecting that a wireless connection fails is higher than a priority of performing cell selection; or
comprises a third condition, and the third condition indicates to the terminal device that a priority of sending the MCG failure message to the MN via the SN in response to the terminal device detecting that a wireless connection fails and that the third condition is met is higher than a priority of performing cell selection; or
comprises a third condition, and the third indication information indicates to the terminal device that a priority of sending the MCG failure message to the MN via the SN in response to the terminal device detecting that a wireless connection fails and that the third condition is met is higher than a priority of performing cell selection; and
wherein the MCG is a group of cells associated with the MN.

10. The apparatus according to claim 9, wherein the third condition comprises a signal quality of the SN being greater than or equal to a second threshold.

11. The apparatus according to claim 8, wherein the fourth condition comprises a cell whose signal quality is greater than or equal to a fifth threshold existing in the candidate cell.

12. An apparatus, which is a terminal device or a chip for the terminal device, comprising:
a processor, and
a non-transitory memory storing a program for execution by the processor, the program including instructions for:
determining whether the terminal device detects a failure of a secondary cell group (SCG);
sending a master cell group (MCG) failure message to a master node (MN) via a secondary node (SN) in response to detecting that a wireless connection fails, and further in response to determining that the terminal device has not detected the failure of the SCG;
performing cell selection in response to determining that the terminal device has detected a failure of the SCG; and
accessing a target cell in response to the target cell being a candidate cell pre-configured by the MN, wherein the target cell is a cell selected by the terminal device during the cell selection, wherein the SCG is a group of cells associated with the SN, and wherein the MCG is a group of cells associated with the MN.

13. The apparatus according to claim 12, wherein the program further includes instructions for:
sending a radio resource control (RRC) reestablishment request message to the target cell in response to the target cell not being the candidate cell.

14. The apparatus according to claim 12, wherein the program further includes instructions to perform, before the sending the master cell group (MCG) failure message to the master node (MN) via the secondary node (SN):
receiving third indication information from the MN;
wherein the third indication information at least one of:
indicates to the terminal device that a priority of sending the MCG failure message to the MN via the SN in response to the terminal device detecting that the wireless connection fails is higher than a priority of performing the cell selection; or
comprises a third condition, and the third condition or the third indication information indicates to the terminal device that a priority of sending the MCG failure message to the MN via the SN in response to the terminal device detecting that the wireless connection fails and that the third condition is met is higher than a priority of performing the cell selection.

15. The apparatus according to claim 14, wherein the third condition comprises a signal quality of the SN being greater than or equal to a second threshold.

16. The apparatus according to claim 12, wherein the program further includes instructions to perform, before the accessing the target cell:
receiving fourth indication information from the MN;
wherein the fourth indication information at least one of:
indicates to the terminal device to access the candidate cell in response to at least one of: the terminal device being unable to send the MCG failure message to the MN via the SN, or the terminal device not receiving a response to the MCG failure message from the MN; or
comprises a fourth condition, and the fourth condition or the fourth indication information indicates to the terminal device to access the candidate cell in response to at least one of: the terminal device being unable to send the MCG failure message to the MN via the SN, or the terminal device not receiving a response to the MCG failure message from the MN, and further in response to the fourth condition being met.

17. The apparatus according to claim 16, wherein the fourth condition comprises a cell whose signal quality is greater than or equal to a fifth threshold existing in the candidate cell.

18. The apparatus according to claim 12, wherein the detecting that the wireless connection fails comprises one or more:
a radio link failure occurring in the MCG;
a handover failure occurring in the MCG;
a radio resource control (RRC) reconfiguration failure occurring; or
an integrity check performed on a data packet received over one or more of a signaling radio bearer (SRB) 1 or an SRB 2 failing.

\* \* \* \* \*